United States Patent
Heo et al.

(10) Patent No.: US 9,753,635 B2
(45) Date of Patent: Sep. 5, 2017

(54) MOBILE TERMINAL AND CONTROLLING METHOD THEREOF

(71) Applicant: LG ELECTRONICS INC., Seoul (KR)

(72) Inventors: Jeongyun Heo, Seoul (KR); Sohoon Yi, Seoul (KR); Yujune Jang, Seoul (KR); Jeonghwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 396 days.

(21) Appl. No.: 14/612,949

(22) Filed: Feb. 3, 2015

(65) Prior Publication Data

US 2015/0220238 A1   Aug. 6, 2015

(30) Foreign Application Priority Data

Feb. 4, 2014   (KR) .................. 10-2014-0012478

(51) Int. Cl.
| | |
|---|---|
| *G06F 3/048* | (2013.01) |
| *G06F 3/0486* | (2013.01) |
| *H04L 12/58* | (2006.01) |
| *G06F 3/0482* | (2013.01) |
| *G06F 3/0488* | (2013.01) |

(52) U.S. Cl.
CPC .......... *G06F 3/0486* (2013.01); *G06F 3/0482* (2013.01); *G06F 3/04883* (2013.01); *H04L 51/22* (2013.01); *G06F 2203/04808* (2013.01)

(58) Field of Classification Search
CPC ..... G06F 3/0486; G06F 3/0481; H04L 51/22; H04L 12/58
USPC ......................... 715/752, 769, 817
See application file for complete search history.

(56) References Cited

U.S. PATENT DOCUMENTS

| | | | | |
|---|---|---|---|---|
| 8,537,980 B2* | 9/2013 | Frazier | ................ | H04L 65/1083 379/88.11 |
| 8,849,900 B2* | 9/2014 | Falchuk | ................ | G06F 9/5061 709/201 |
| 9,401,884 B2* | 7/2016 | Santhanam | ............. | H04L 51/16 |
| 2002/0120695 A1* | 8/2002 | Engstrom | ............ | G06Q 10/107 709/206 |
| 2007/0112926 A1* | 5/2007 | Brett | .................... | G06Q 10/109 709/206 |
| 2008/0027960 A1* | 1/2008 | Fulgham | ............. | G06Q 10/107 |
| 2009/0150363 A1* | 6/2009 | Gross | ................ | G06F 17/30398 |
| 2012/0210214 A1* | 8/2012 | Yoo | ....................... | G06F 3/0482 715/702 |

(Continued)

*Primary Examiner* — Daeho Song
(74) *Attorney, Agent, or Firm* — Ked & Associates, LLP

(57) ABSTRACT

A mobile terminal and controlling method thereof are disclosed, by which an email necessary for a user can be selectively updated only. The present invention includes a wireless communication unit configured to receive emails sent to a user from an email server, a display unit configured to display a list of the emails received from the email server, and a controller, if receiving a drag input of moving a pointer touching the display unit in a prescribed direction, partitioning at least one portion of the display unit into a plurality of region having different update references assigned thereto, the controller, if the drag input is ended, controlling the email list to be updated based on an update reference assigned to a prescribed region corresponding to a location having the drag input ended thereat among a plurality of the regions.

21 Claims, 31 Drawing Sheets

(a)

(b)

(c)

(56) References Cited

U.S. PATENT DOCUMENTS

| | | | |
|---|---|---|---|
| 2013/0179800 A1* | 7/2013 | Jeong | G06F 3/04817 |
| | | | 715/752 |
| 2013/0185336 A1* | 7/2013 | Singh | G06F 17/30654 |
| | | | 707/794 |
| 2014/0059448 A1* | 2/2014 | Lee | H04L 51/066 |
| | | | 715/752 |
| 2014/0136990 A1* | 5/2014 | Gonnen | H04L 51/18 |
| | | | 715/752 |
| 2014/0365505 A1* | 12/2014 | Clark | G06F 17/30864 |
| | | | 707/748 |
| 2015/0149927 A1* | 5/2015 | Walkin | H04L 51/10 |
| | | | 715/752 |

\* cited by examiner

FIG. 7
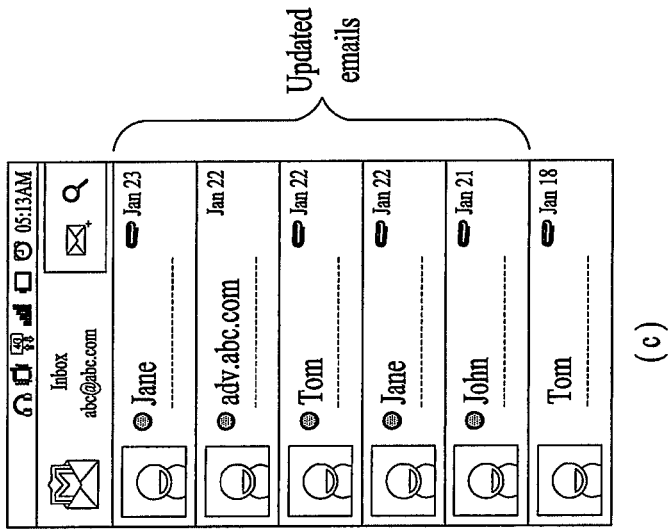
(c)
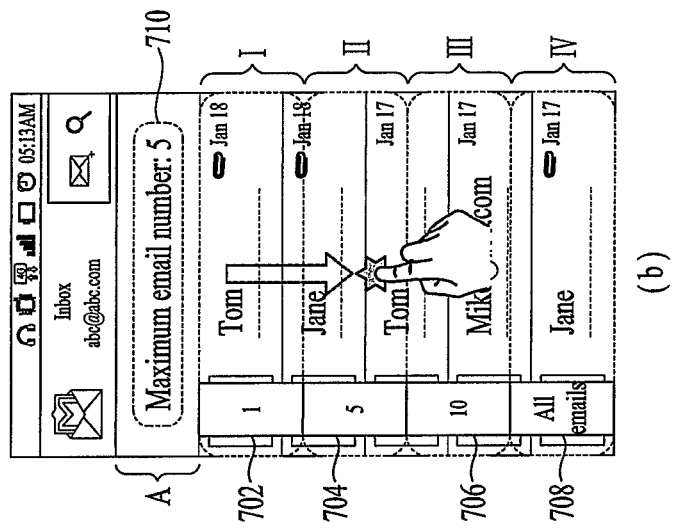
(b)
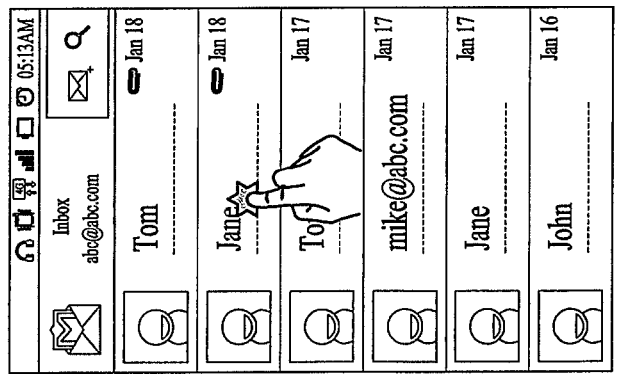
(a)

FIG. 8
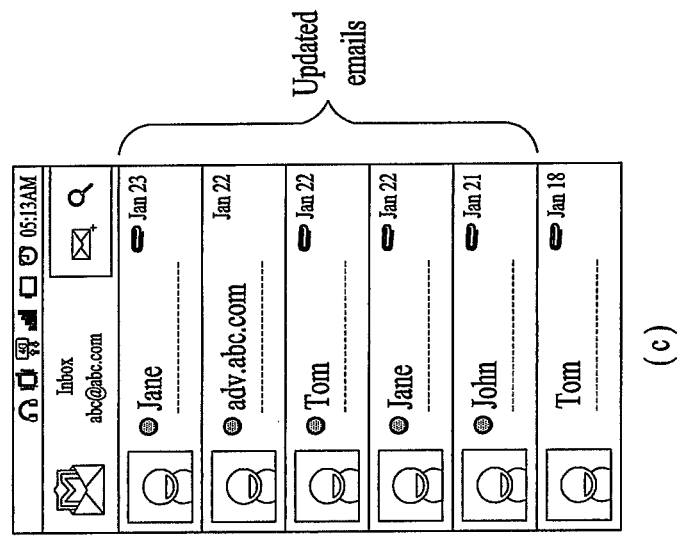
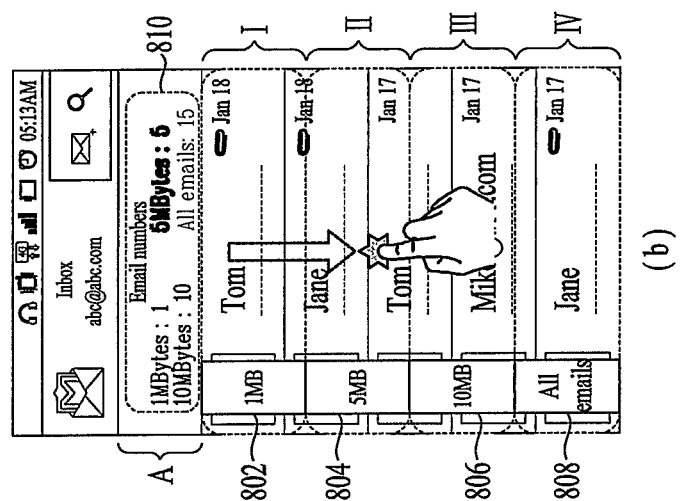
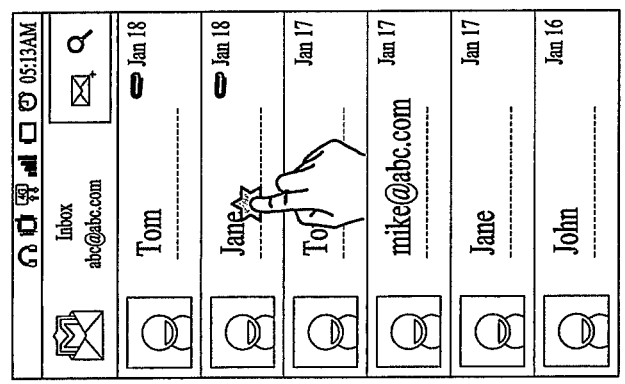

FIG. 11
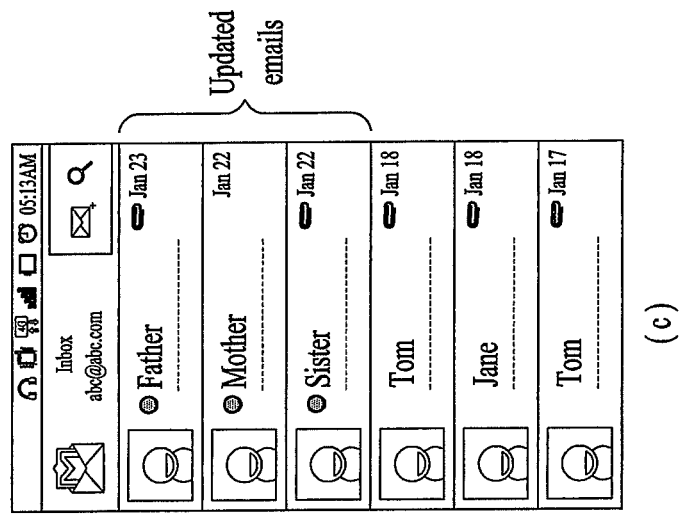
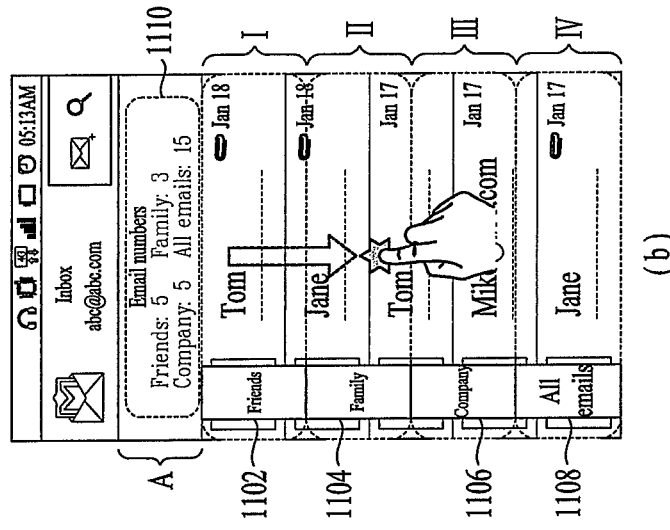
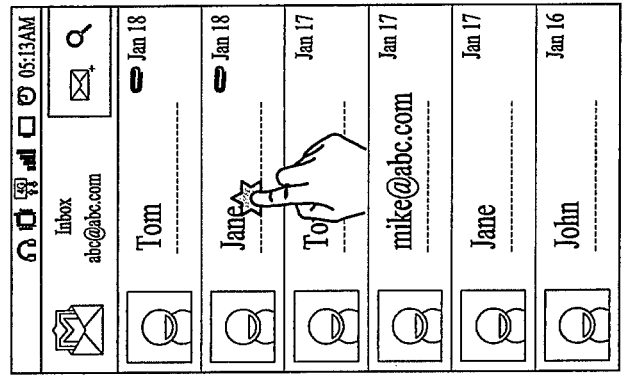

FIG. 14A
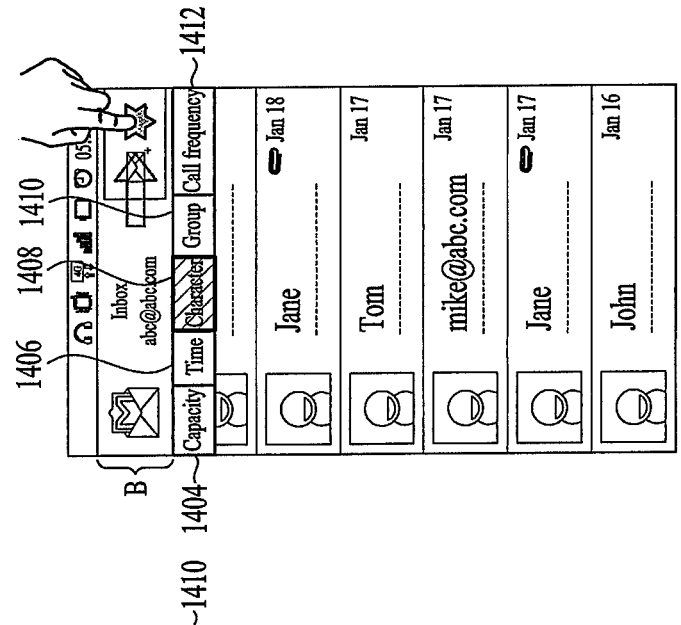
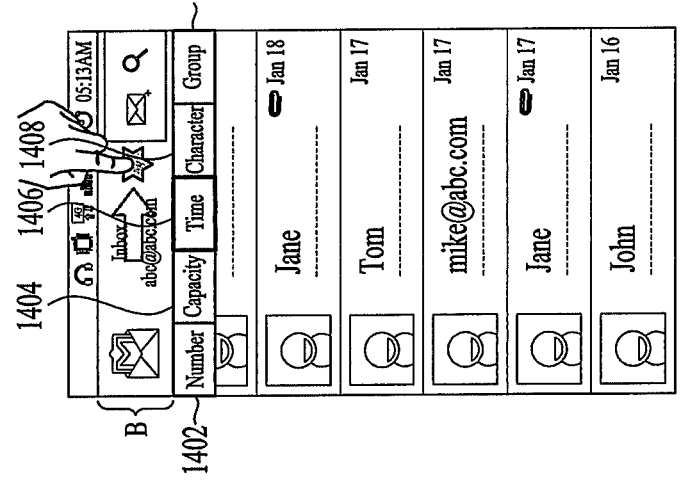
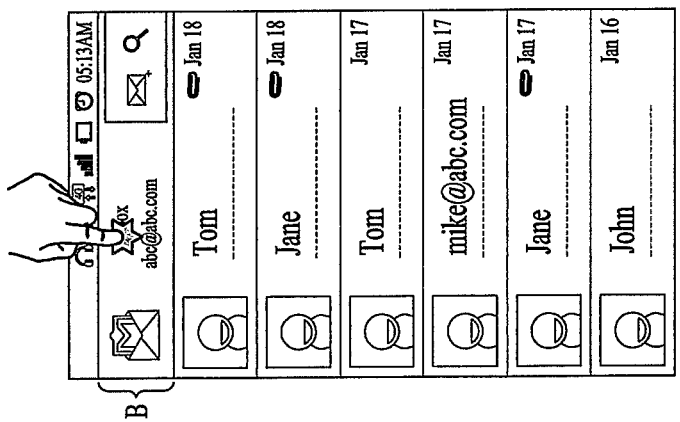

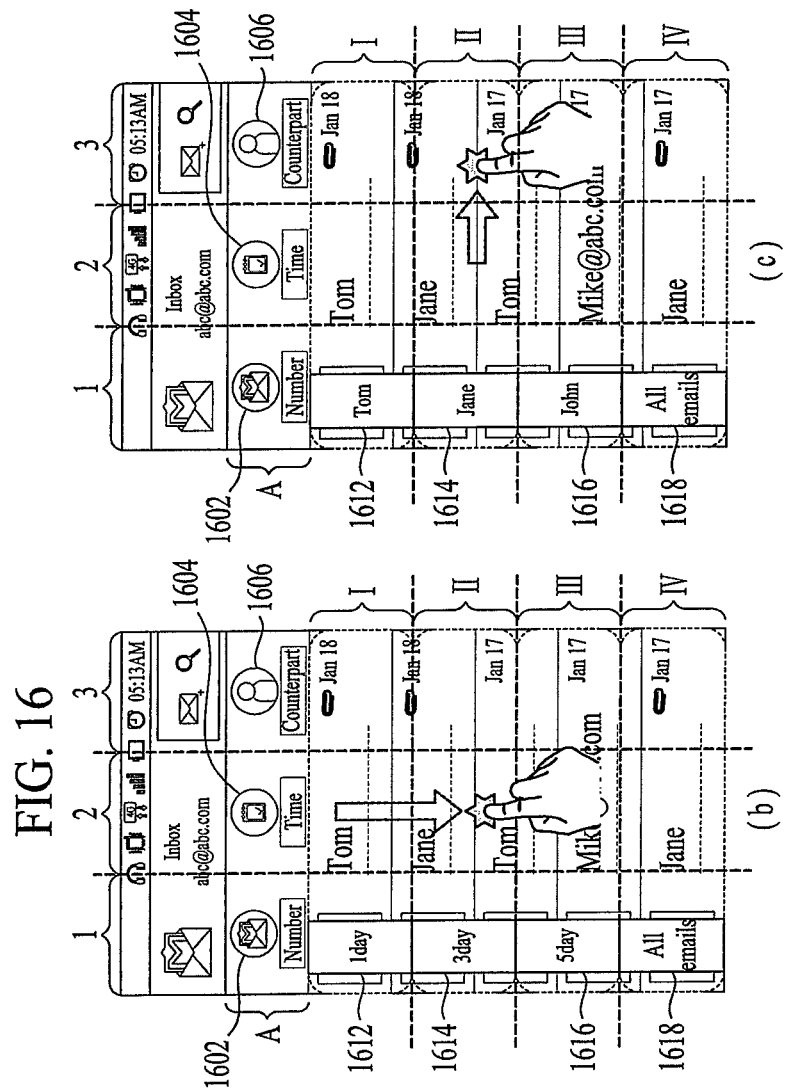
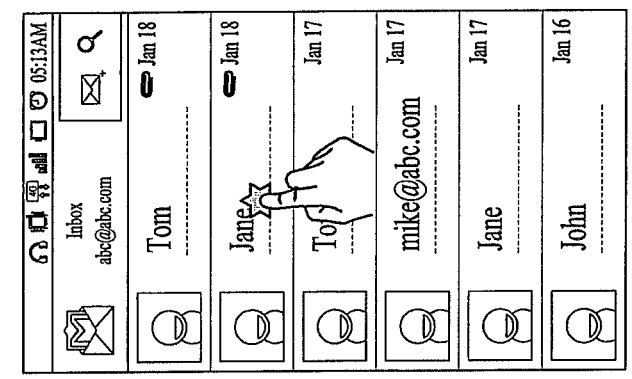
FIG. 16

FIG. 18
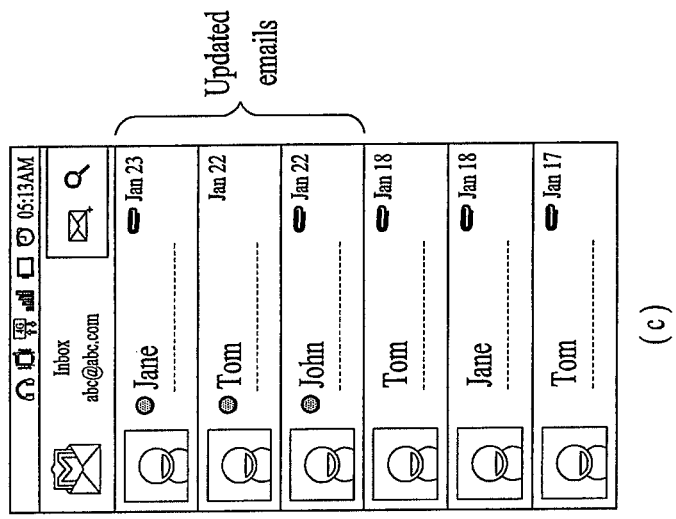
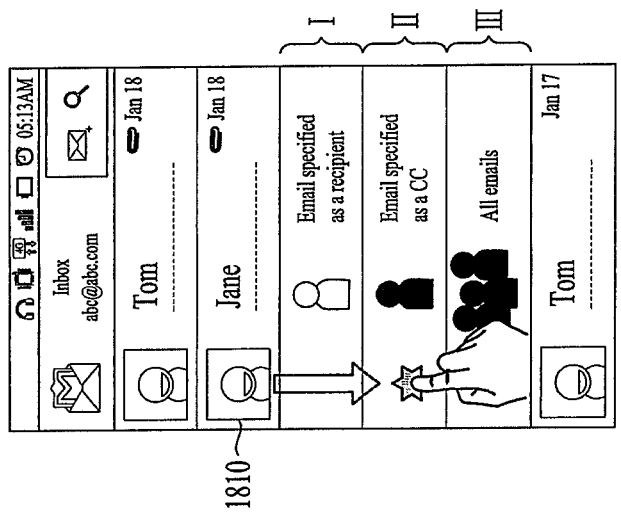
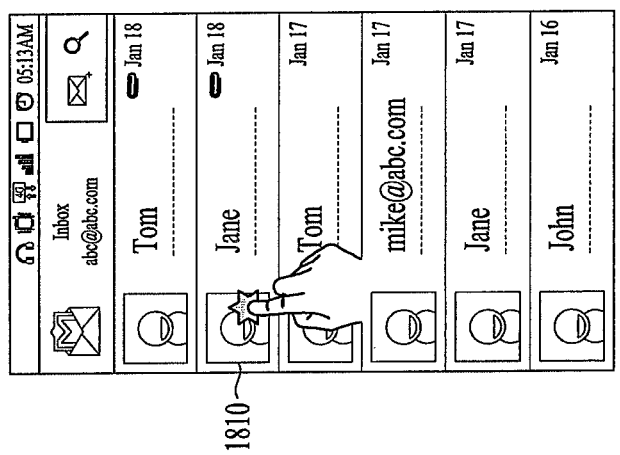

FIG. 22

FIG. 25
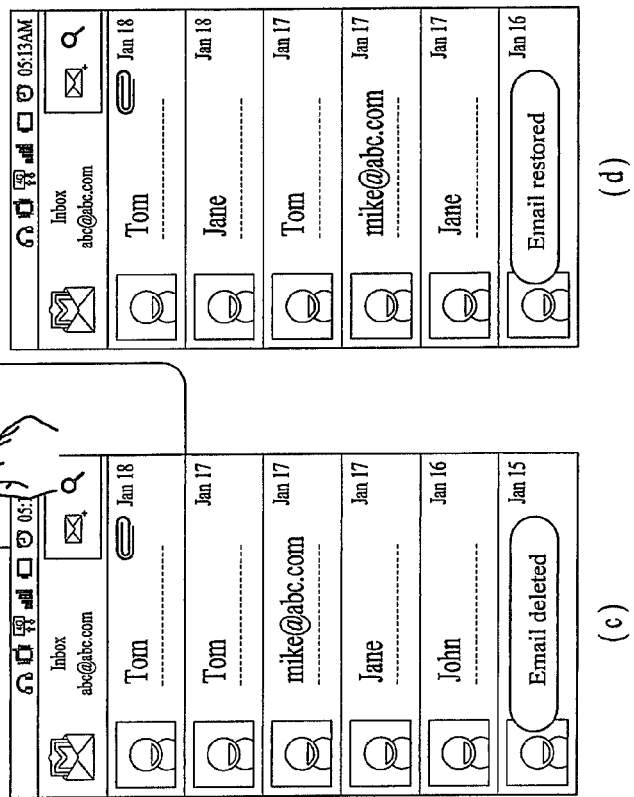
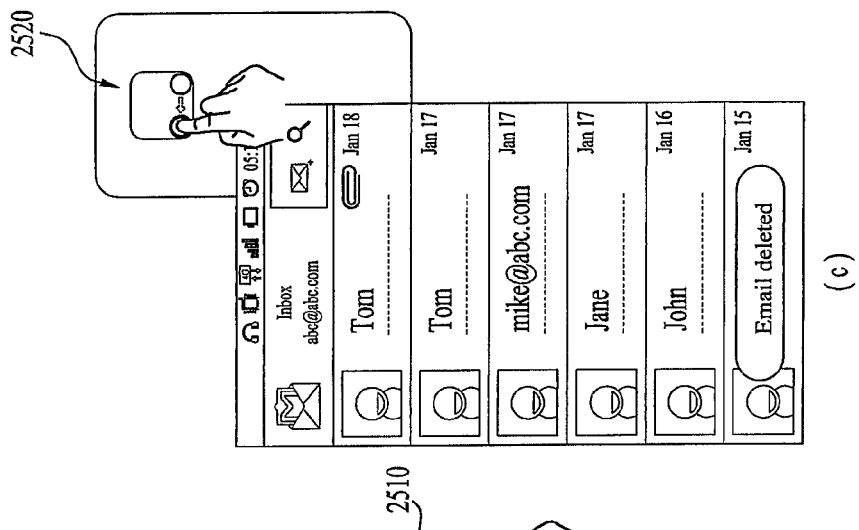
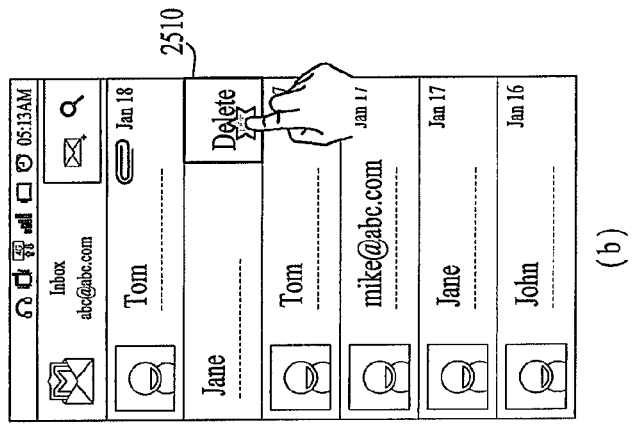
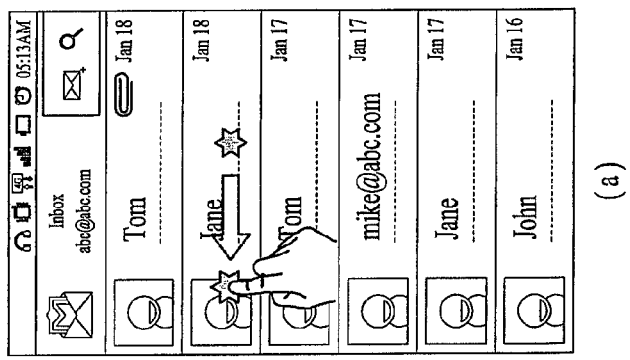

FIG. 28
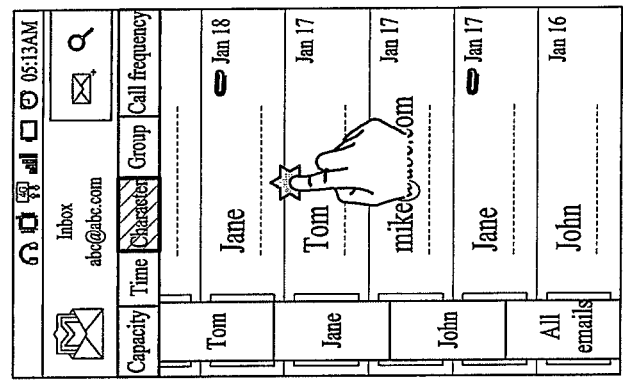
(c)
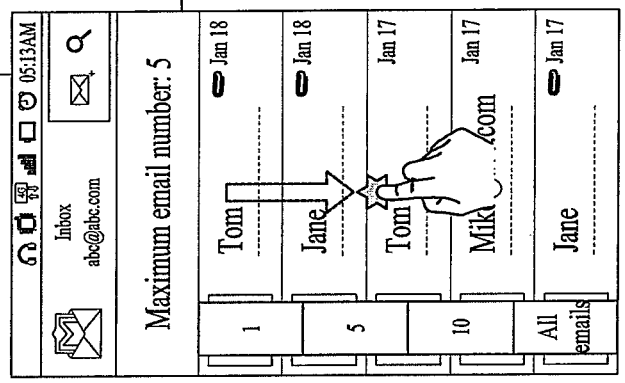
(b)
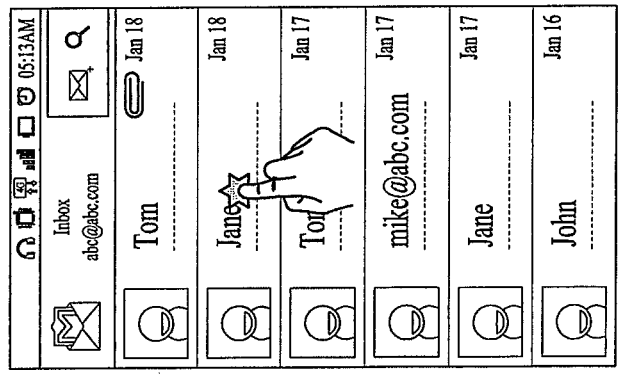
(a)

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application No. 10-2014-0012478, filed on Feb. 4, 2014 the contents of which are hereby incorporated by reference herein in its entirety.

BACKGROUND

1. Field

The present invention relates to a mobile terminal, and more particularly, to a mobile terminal and controlling method thereof. Although the present invention is suitable for a wide scope of applications, it is particularly suitable for selectively updating an email necessary for a user only.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal turns into a device capable of handling various communication media owing to the diverse functionality of the mobile terminal. For instance, a recent mobile terminal can handle such various media for communication between users as a phone call, a text message, an instant message, an SNS (social network service), an email and the like.

As emails can be sent and received through mobile terminals, the number of users intending to use mobile terminals for business is increasing. And, the number of email transactions through mobile terminals is exponentially increasing as well. For instance, once a user registers information for an access at an email server, a mobile terminal is able to receive an email sent to a user from the email server or send an email composed by the user to the email server using the registered information.

A mobile terminal can perform an update of receiving an email newly sent to a user from an email server periodically or in case of an occurrence of a specific event. In particularly, a mobile terminal can update received emails by receiving all emails newly sent to a user except an email primarily filtered by an email server. However, a related art mobile terminal fails to provide a method of selectively updating an email actually necessary for a user only.

BRIEF DESCRIPTION OF THE DRAWINGS

The embodiments will be described in detail with reference to the following drawings in which like reference numerals refer to like elements wherein:

FIG. 7 is a diagram for one example of updating an email list by limiting the maximum number of emails;

FIG. 8 is a diagram for one example of updating an email list by limiting the maximum number of emails;

FIG. 11 is a diagram for one example of updating an email received from a specific contact group only;

FIG. 14A is a diagram for one example for a user to change an upper reference;

FIG. 16 is a diagram for one example of when a display unit is partitioned into a plurality of cells, assigning an upper reference and a selected lower reference to a vertical column and a horizontal row, respectively;

FIG. 18 is a diagram for one example of updating an email newly received from a specific counterpart only;

FIG. 22 is a diagram for one example of displaying an email matching a specific reference only;

FIG. 25 is a diagram for one example of reconstructing a deleted email;

FIG. 28 is a diagram for one example to describe an operation of a mobile terminal in response to a reception of a preset user input through an input unit in the course of applying a drag input.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
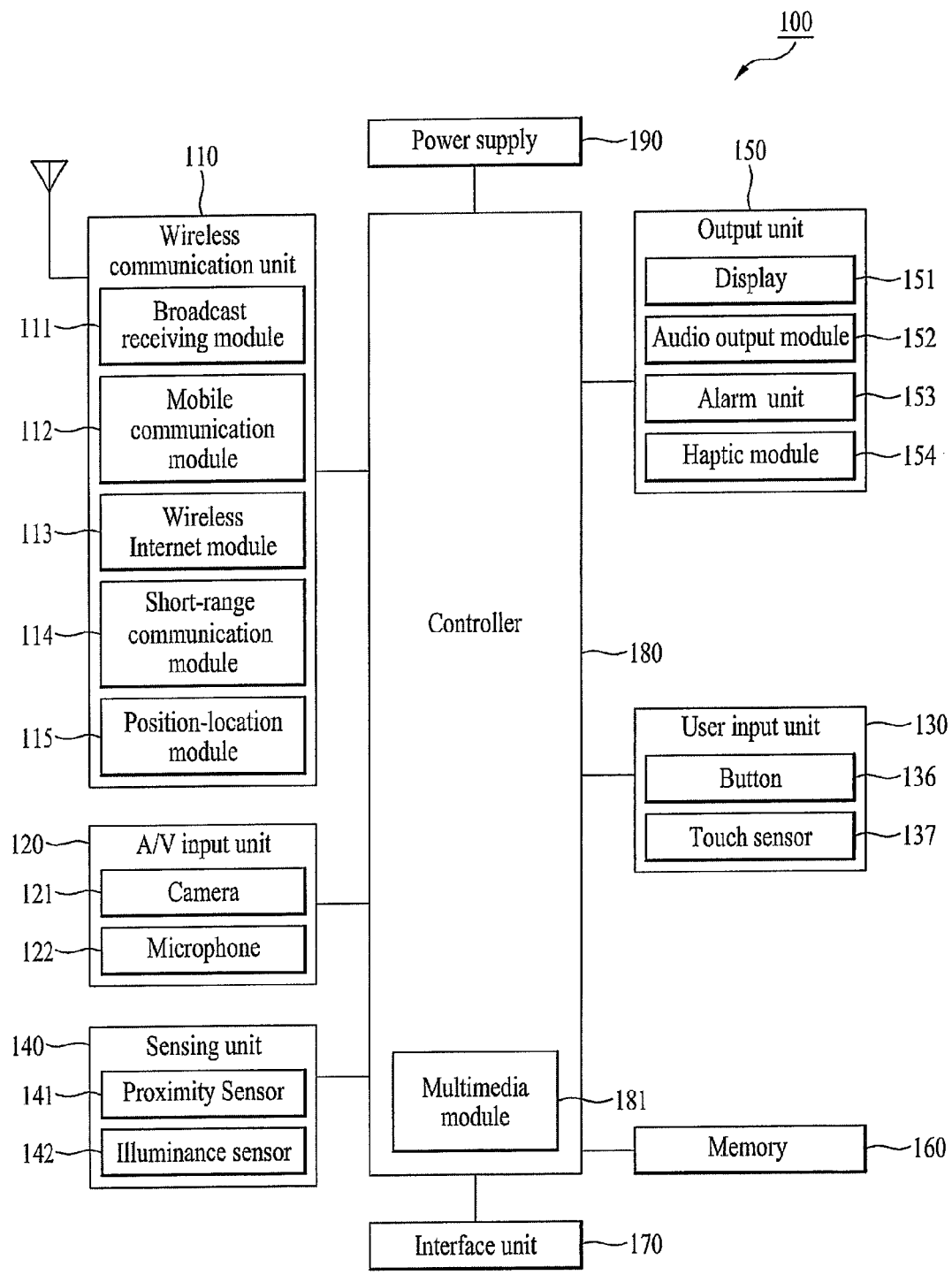
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
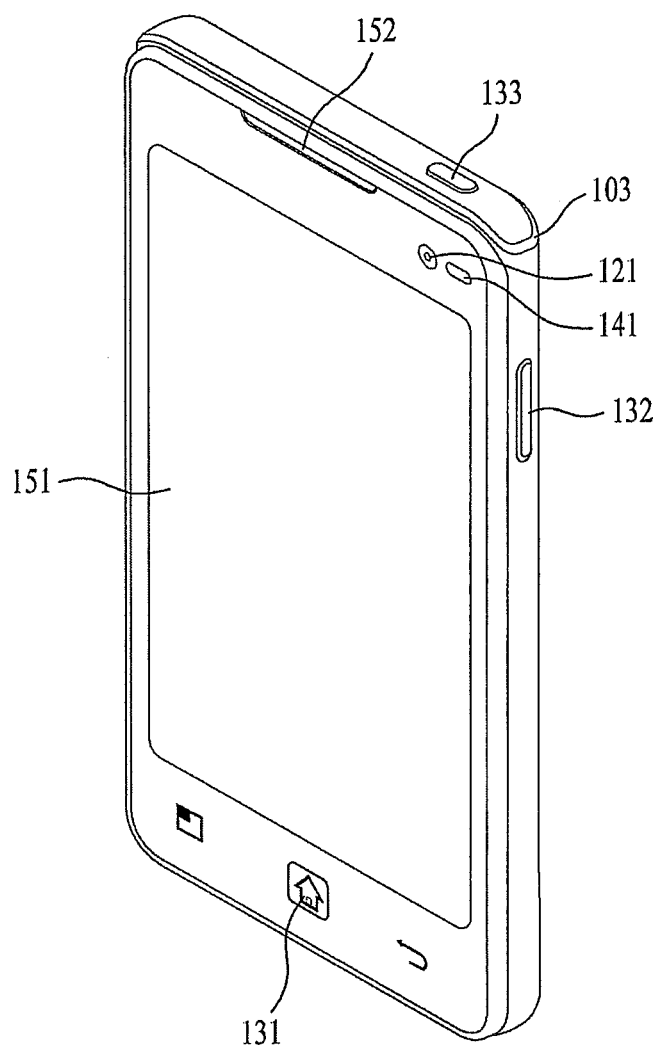
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
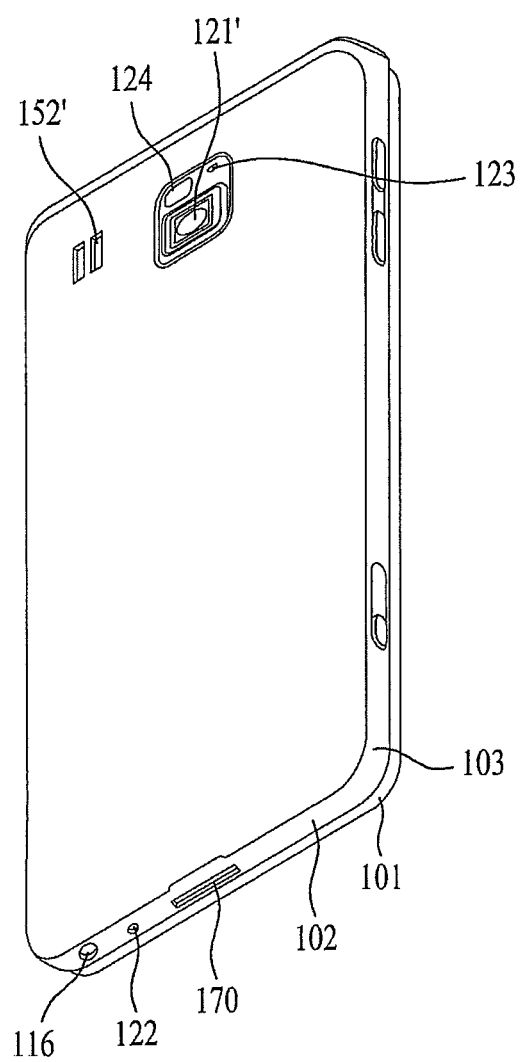
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal 100 mentioned in the following description includes at least one of the components shown in FIG. 1. In particular, assume that a mobile terminal 100 according to the present invention includes the wireless communication unit 110, the display unit 151, the memory 160 and the controller 180.

If the display unit 151 of the mobile terminal 100 includes a touchscreen, implementation of the mobile terminal 100 according to the present invention can be further facilitated. Hence, in the following description, assume that the display unit 151 includes the touchscreen.

According to the present invention, access information for an access to an email server may be saved in the memory 160. In this case, the access information may include an address (e.g., IP address, URL address, etc.) of the email server to connect to the email server, an email address for long in to the email server, a password, and the like. In this case, the address of the email server may include an address of a sending server (e.g., SMTP (simple mail transfer protocol) server, etc.) and an address of a receiving server (e.g., POP (post office protocol) server, IMAP (internet messaging access protocol) server, etc.).

The wireless communication unit 110 accesses the email server using the access information and is then able to send/receive an email through the email server. In particular, the wireless communication unit 110 transmits an email composed in the mobile terminal 100 by a user to the sending server (e.g., SMTP server), whereby the email composed by the user can be transferred to a destination. And, the wireless communication unit receives an email sent to the user from the receiving server (e.g., POP server, IMAP server, etc.), whereby the user can check the received email through the mobile terminal 100.

Figure 4:
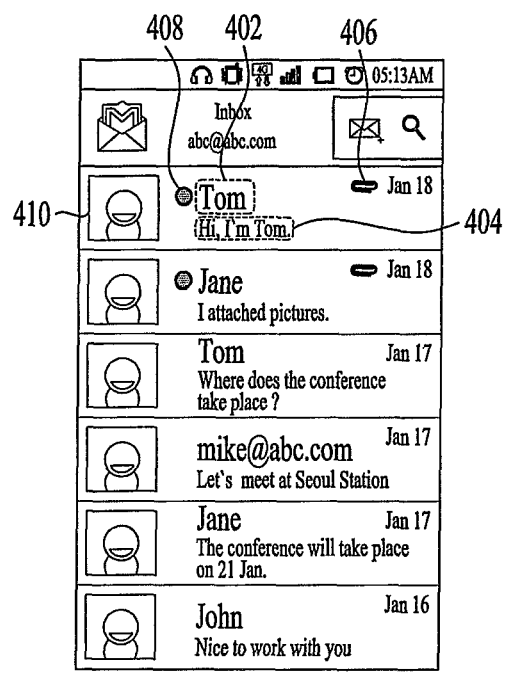
FIG. 4 is a diagram for one example of displaying an email list.

If an email transferred a user from the email server is received, the controller 180 can control a list of received emails to be displayed through the display unit. For instance, FIG. 4 is a diagram for one example of displaying an email list. Referring to FIG. 4, if a prescribed email is selected from an email list, the controller 180 can control details of the selected email to be displayed. On each item of the email list, an information 402 (e.g., a name of the counterpart, an email address of the counterpart, etc.) on a counterpart having sent a corresponding email and a schematic content (e.g., a title of the email, a portion of a content included in a text of the email, etc.) of the corresponding email can be displayed. Moreover, on each item, an indicator 406 indicating a presence of a file attached to an email and an indicator 408 indicating that a user has not checked the corresponding email can be displayed. On each item, an image 410 representing a counterpart having sent the corresponding email may be displayed.

The controller 180 can sort the received times of emails or names of counterparts having sent emails in ascending or descending order. The controller 180 may sort emails in accordance with such a condition as a presence or non-presence of an attached file, a presence or non-presence of a user-read email, or the like.

The controller 180 can update a user's email list by prescribed periods or on the condition that a prescribed event occurs. For instance, if an email list is set to be updated every 5 minutes, the controller 180 controls the wireless communication unit 110 to check whether an email newly received from an email server exists every 5 minutes. If the newly received email exists, the controller 180 may control a new mail to be received from the email server. For another instance, if a user's email list is set to be updated on the condition that a prescribed event occurs, the controller 180 controls the wireless communication unit 110 to check whether an email newly received from an email server exists every 5 minutes. If the newly received email exists, the controller 180 may control a new mail to be received from the email server. In this case, the prescribed event may include one of a case that an email application is run, a case that a preset user input is received in the course of running an email application, and the like.

Figure 5:
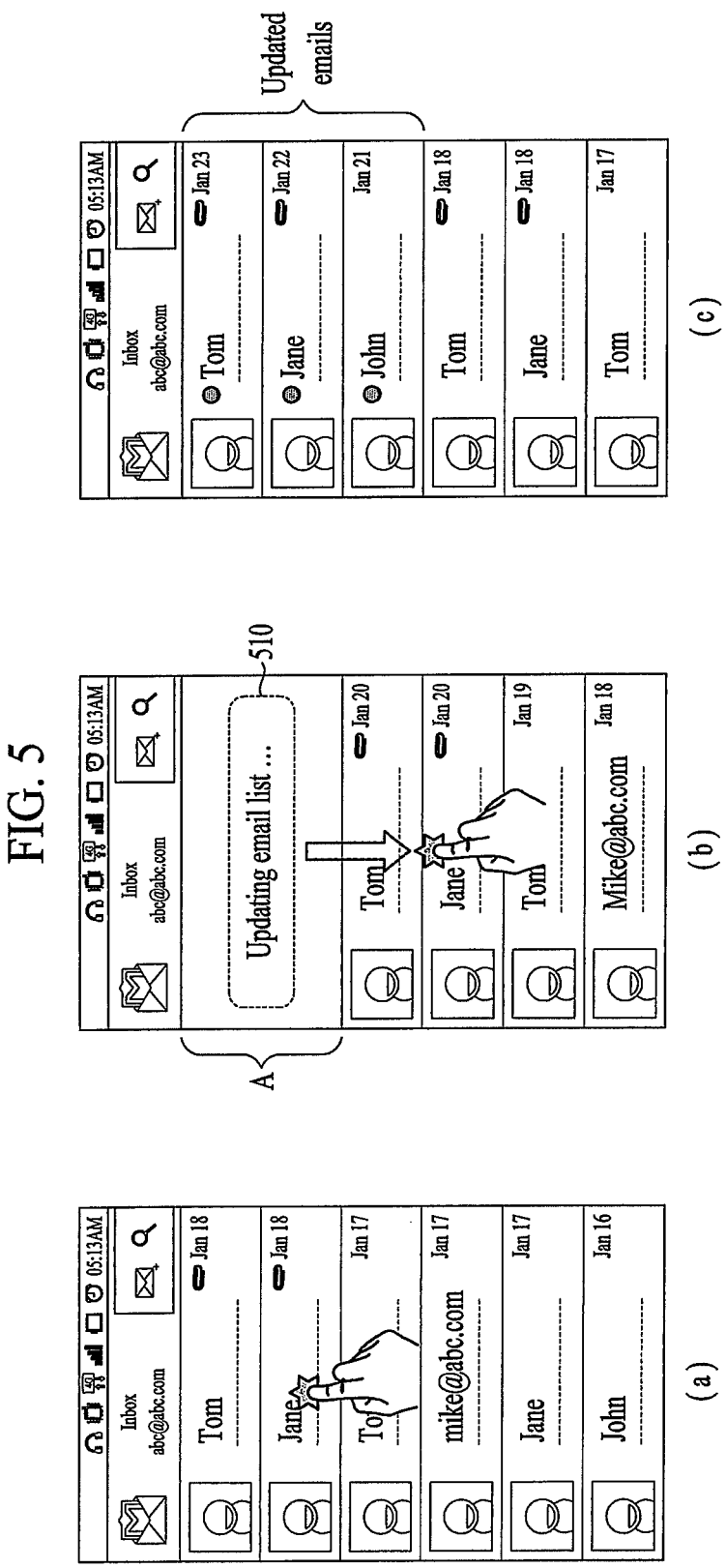
FIG. 5 is a diagram for one example of updating an email list in response to a reception of a preset user input.

For instance, FIG. 5 is a diagram for one example of updating an email list in response to a reception of a preset user input. While a top end portion of an email list is displayed, referring to FIG. 5 (*a*) and FIG. 5 (*b*), if a drag input of intending to scroll the email list in a top direction is applied, the controller 180 controls the wireless communication unit 110 to check whether an email newly received from an email server exist and is also able to control a message 510, which indicates that the email list is being updated, to be displayed. In this case, the action of scrolling the email list in the top direction may mean that a new information can appear from a top side of the email list by covering information displayed below a bottom side of the email list. According to the example shown in FIG. 5 (*b*), the message 510 is outputted through a new region A exposed newly as the email list moves in the bottom direction, by which a display location of the message 510 is non-limited.

As the top end portion of the email list is displayed, although it is unable to further display new information on the top side of the email list with a previously received email only, if a user input of intending to scroll the email list in the top direction is received, the controller 180 can control the email list to be updated. If a new email is received from the email server, referring to FIG. 5 (*c*), the controller 180 may be able to add the newly received email to the email list.

Yet, the email list update method shown in FIG. 5 fails to provide a method of selectively receiving an email actually necessary for a user only among new emails. In particular, a spam (or junk) mail failing to be filtered off by the email server can be transmitted to the mobile terminal 100 during an email list update. This weakens the security of the mobile terminal 100 and may trigger unnecessary traffic undesired by a user by increasing a data reception quantity of the mobile terminal 100.

Moreover, as an email list has not been updated for a long time, if too many new mails exist, when the email list is updated, it may cause a problem of an unexpected reception of an excessive quantity of data.

Therefore, the mobile terminal 100 according to the present invention intends to provide a method of selectively receiving an email actually necessary for a user only or a method of receiving an appropriate number of emails only. In the following description, the mobile terminal 100 according to the present invention is explained in detail with reference to an operational flowchart shown in FIG. 6.

Figure 6:
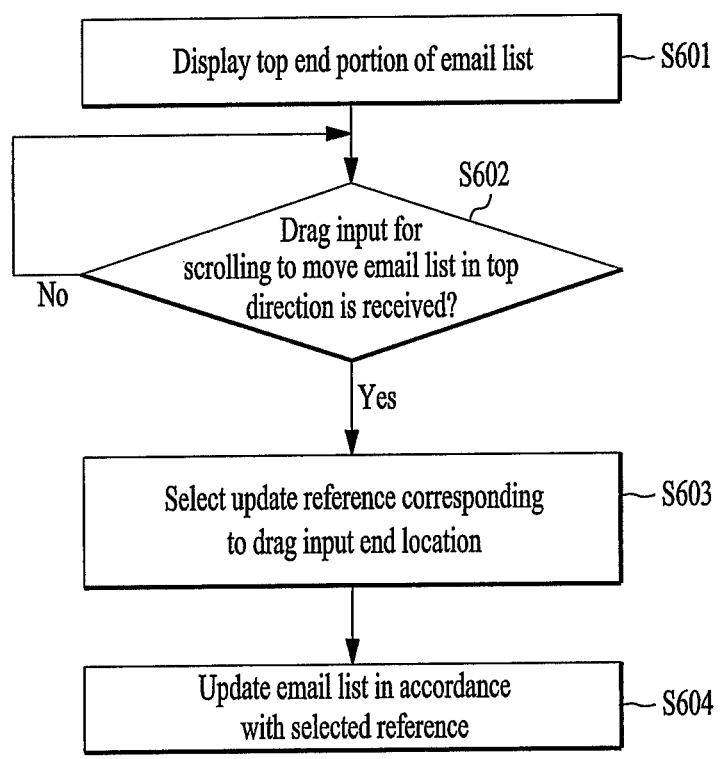
FIG. 6 is a flowchart of a mobile terminal according to the present invention.

FIG. 6 is a flowchart of a mobile terminal according to the present invention.

Referring to FIG. 6, while a top end portion of an email list is displayed [S601], if a drag input for scrolling the email list in a top direction with a pointer is received [S602], the controller 180 determines an update reference corresponding to a drag input end location [S603] and is then able to control the email list to be updated in accordance with the determined reference [S604].

In particular, the controller 180 partitions the display unit 151 into a plurality of virtual regions to which different update references are assigned, respectively. The controller 180 is then able to select the update reference assigned to the region corresponding to the drag input end location. In this case, the update reference may indicate at least one of a maximum email number, a maximum received data size, an update time, an information on a counterpart having sent an email, a contact group, a frequency of contacts with an email sending counterpart, and a user position.

One example of updating an email list in accordance with an update reference is described in detail with reference to the accompanying drawing as follows.

FIG. 7 is a diagram for one example of updating an email list by limiting the maximum number of emails. While a top end portion of an email list is displayed, referring to FIG. 7 (a) and FIG. 7 (b), if a drag input of intending to scroll the email list in a top direction is received, the controller 180 can control the display unit 151 to be partitioned into a plurality of regions. In particular, as the email list moves in a bottom direction, if a new region A is exposed at an email list displayed location, the controller 180 partitions a remaining region except the new region A into a plurality of regions and is then able to assign the maximum email numbers to a plurality of the regions, respectively. For instance, according to the example shown in FIG. 7 (b), '1', '5', '10' and 'All emails' are assigned to the 4 regions I to IV, respectively.

Through the new region A, which is newly exposed as the email list moves in the bottom direction, the controller 180 can control an update reference, which is estimated as selected in accordance with a location of a pointer, to be displayed. Since the pointer is located in the region of which maximum receivable email number is 5 [FIG. 7 (b)], the controller 180 may control a message 710, which indicates that the maximum receivable email number is '5', to be outputted through the new region A.

Thereafter, if the pointer is released, the drag input is ended. If the drag input is ended, the controller 180 can control the email list to be updated by being limited to the maximum number assigned to the region corresponding to a drag input end location (i.e., a pointer released location). For instance, if the pointer is released from the region II of which maximum receivable email number is 5, referring to FIG. 7 (c), the controller 180 can control maximum 5 emails to be received from the email server. In particular, even if the number of emails newly sent to the user is equal to or greater than 5, the controller 180 controls maximum 5 emails to be received only, thereby preventing an excessive amount of data from being received.

If the pointer is released from the region I indicating '1', the controller 180 may control maximum 1 email to be received from the email server. If the pointer is released from the region III indicating '10', the controller 180 may control maximum 10 emails to be received from the email server. Moreover, if the pointer is released from the region IV indicating 'reception of all emails', the controller 180 may control all emails, which are newly sent to the user, to be received from the email server without limitations put on the email number.

In order to enable a user to recognize the maximum numbers respectively assigned to the regions, the controller 180 can control an indicator indicating the maximum email number assigned to each of the regions to be displayed on the display unit 151. According to the example shown in FIG. 7 (b), indicators 702, 704, 706 and 708 of bar types displayed on one side of the display unit 151 indicate the maximum email numbers assigned to the regions, respectively.

Moreover, the controller 180 can control the region, which corresponds to the location of the pointer moving by drag, to be identifiably displayed. For instance, the controller 180 may change a color of the region corresponding to the location of the pointer moving by drag. And, the controller 180 can control a color of a part (indicated by a reference number 704 in FIG. 7 (b)), which corresponds to the location of the pointer moving by drag in each of the bar type indicators 702, 704, 706 and 708 shown in FIG. 7 (b), to be changed. For another instance, in case that indicators have different colors in regions, respectively, the controller 180 may control a color of a new region, which is newly exposed as the email list moves in the bottom direction, to be changed into a color of an indicator displayed at the location of the pointer moving by drag.

The maximum email number assigned to each of the regions may include a value previously set by a user, by which the maximum email number is non-limited. For instance, if an update of an email list is requested (i.e., if a drag input is received), the controller 180 obtains a total number of emails newly sent to a user from the email server and is then able to control the maximum email number appropriate for each of the regions to be assigned to the corresponding region to match the total number of the emails. For instance, referring to FIG. 7 (b), a common ratio (e.g., a common ratio '5' applying to 1, 5 and 10) or a common difference (not shown in the drawing) may apply to the maximum email number assigned to the remaining regions except the region having 'all reception' assigned thereto.

FIG. 8 is a diagram for one example of updating an email list by limiting the maximum number of emails. While a top end portion of an email list is displayed, referring to FIG. 8 (a) and FIG. 8 (b), if a drag input of intending to scroll the email list in a top direction is received, the controller 180 can control the display unit 151 to be partitioned into a plurality of regions. In particular, as the email list moves in a bottom direction, if a new region A is exposed at an email list displayed location, the controller 180 partitions a remaining region except the new region A into a plurality of regions I to IV and is then able to assign data amounts, which are to be received from the email server, to a plurality of the regions, respectively. For instance, according to the example shown in FIG. 8 (b), the display unit 151 includes 4 regions I to IV to which '1 MBytes', '5 MBytes', '10 MBytes' and 'All emails' are assigned, respectively.

Through the new region A, which is newly exposed as the email list moves in the bottom direction, the controller 180 can control an update reference, which is estimated as selected in accordance with a location of a pointer, a number of emails, which are estimated as received per update reference, and the like to be displayed. For instance, according to the example shown in FIG. 8 (b), a message 810 is displayed on the new region A to indicate the following. First of all, if '1 MBytes' is selected, the receivable email number is 1. Secondly, if '5 MBytes' is selected, the receivable email number is 5. Thirdly, if '10 MBytes' is selected, the receivable email number is 10. Finally, if 'All emails' is selected, the receivable email number is 15.

The controller 180 indicates the number of emails estimated as received per update reference through the new region A and is also able to control an update reference, which corresponds to a current location of the pointer, to be identifiably displayed. For instance, referring to FIG. 8 (*b*), the controller 180 can represent the update reference '5 MBytes' corresponding to a current location of the pointer in bold letters. Besides, if the pointer moves to the region III representing '10 MBytes', '10 MBytes' in the new region may be displayed in bold letters [not shown in the drawing].

Thereafter, if the pointer is released, the drag input is ended. If the drag input is ended, the controller 180 can control the email list to be updated by being limited to the data capacity assigned to the region corresponding to a drag input end location (i.e., a pointer released location). For instance, if the pointer is released from the region II to which '5 MBytes' is assigned, referring to FIG. 8 (*c*), the controller 180 can control data of maximum 5 MBytes to be received from the email server. In particular, even if a sum of a total amount of emails newly sent to the user is greater than 5 MBytes, the controller 180 controls emails to be received in a maximum range of 5 MBytes, thereby preventing an excessive amount of data from being received.

If the pointer is released from the region I indicating '1 MBytes', the controller 180 may control data of maximum 1 MBytes to be received from the email server. If the pointer is released from the region III indicating '10 MBytes', the controller 180 may control data of maximum 10 MBytes to be received from the email server. Moreover, if the pointer is released from the region IV indicating 'reception of all emails', the controller 180 may control all emails, which are newly sent to the user, to be received from the email server without limitations put on the capacity.

In order to enable a user to recognize the maximum received data capacity assigned to each region, the controller 180 can control an indicator indicating the maximum received data capacity assigned to each of the regions to be displayed on the display unit 151. According to the example shown in FIG. 8 (*b*), indicators 802, 804, 806 and 808 of bar types displayed on one side of the display unit 151 indicate the maximum email numbers assigned to the regions, respectively.

Moreover, the controller 180 can control the region, which corresponds to the location of the pointer moving by drag, to be identifiably displayed. For instance, the controller 180 may change a color of the region corresponding to the location of the pointer moving by drag. And, the controller 180 can control a color of a part (indicated by a reference number 804 in FIG. 8 (*b*)), which corresponds to the location of the pointer moving by drag in each of the bar type indicators 802, 804, 806 and 808 shown in FIG. 8 (*b*), to be changed. For another instance, in case that indicators have different colors in regions, respectively, the controller 180 may control a color of a new region, which is newly exposed as the email list moves in the bottom direction, to be changed into a color of an indicator displayed at the location of the pointer moving by drag.

The maximum received data capacity assigned to each of the regions may include a value previously set by a user, by which the maximum received data capacity is non-limited. For instance, if an update of an email list is requested (i.e., if a drag input is received), the controller 180 obtains a total capacity of emails newly sent to a user from the email server and is then able to control the maximum received data capacity appropriate for each of the regions to be assigned to the corresponding region to match the total capacity. For instance, referring to FIG. 8 (*b*), a common ratio (e.g., a common ratio '5' applying to 1, 5 and 10) or a common difference (not shown in the drawing) may apply to the maximum received data capacity assigned to the remaining regions except the region having 'all reception' assigned thereto.

Figure 9:
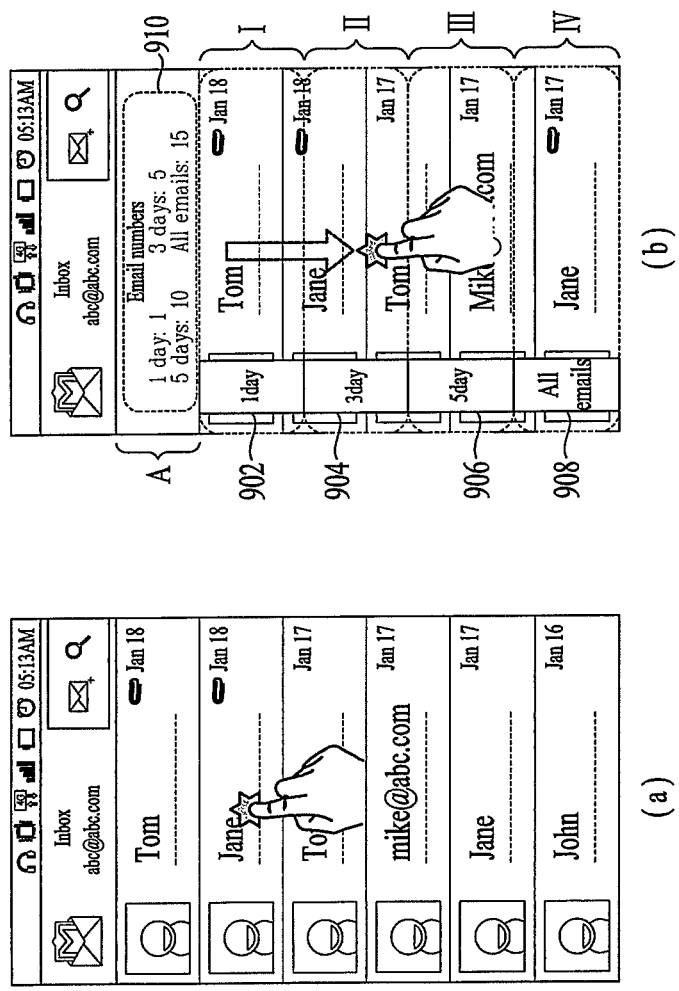
FIG. 9 is a diagram for one example of updating an email list in accordance with an update time.

FIG. 9 is a diagram for one example of updating an email list in accordance with an update time. While a top end portion of an email list is displayed, referring to FIG. 9 (*a*) and FIG. 9 (*b*), if a drag input of intending to scroll the email list in a top direction is received, the controller 180 can control the display unit 151 to be partitioned into a plurality of regions. In particular, as the email list moves in a bottom direction, if a new region A is exposed at an email list displayed location, the controller 180 partitions a remaining region except the new region A into a plurality of regions I to IV and is then able to assign update times to a plurality of the regions, respectively. For instance, according to the example shown in FIG. 9 (*b*), the display unit 151 includes 4 regions to which '1 day', '3 days', '5 days' and 'All emails' are assigned, respectively.

Through the new region A, which is newly exposed as the email list moves in the bottom direction, the controller 180 can control an update reference, which is estimated as selected in accordance with a location of a pointer, a number of emails, which are estimated as received per update reference, and the like to be displayed. For instance, according to the example shown in FIG. 9 (*b*), a message 910 is displayed on the new region A to indicate the following. First of all, if '1 day' is selected, the receivable email number is 1. Secondly, if '3 days' is selected, the receivable email number is 5. Thirdly, if '5 days' is selected, the receivable email number is 10. Finally, if 'All emails' is selected, the receivable email number is 15.

The controller 180 indicates the number of emails estimated as received per update reference through the new region A and is also able to control an update reference, which corresponds to a current location of the pointer, to be identifiably displayed. For instance, referring to FIG. 9 (*b*), the controller 180 can represent the update reference '3 days' corresponding to a current location of the pointer in bold letters.

Thereafter, if the pointer is released, the drag input is ended. If the drag input is ended, the controller 180 can control the email list to be updated based on the update time assigned to the region corresponding to a drag input end location (i.e., a pointer released location). For instance, if the pointer is released from the region II to which '3 days' is assigned as the update time, referring to FIG. 9 (*c*), the controller 180 can control an email, which is received within 3 days from a current date, to be received from the email server. If the current date is 2014-1-23, the controller 180 may receive emails, which have been sent between 2014-1-20 and 2014-1-23, from the email server. In particular, the controller 180 can control the emails, which have been received during the period of time set as the update time among the emails newly sent to a user from the update server, to be displayed only.

If the pointer is released from the region I having the update time '1 day' assigned thereto, the controller 180 may control emails, which have been received in a day from a current date, to be received from the email server. If the pointer is released from the region III having the update time '5 days' assigned thereto, the controller 180 may control emails, which have been received in 5 days from the current date, to be received from the email server. Moreover, if the pointer is released from the region IV indicating 'reception of all emails', the controller 180 may control all emails, which are newly sent to the user, to be received from the email server without limitations put on the update time.

In order to enable a user to recognize the update time assigned to each region, the controller 180 can control an indicator indicating the update time assigned to each of the regions to be displayed on the display unit 151. According to the example shown in FIG. 9 (b), indicators 902, 904, 906 and 908 of bar types displayed on one side of the display unit 151 indicate the update times assigned to the regions, respectively.

Moreover, the controller 180 can control the region, which corresponds to the location of the pointer moving by drag, to be identifiably displayed. For instance, the controller 180 may change a color of the region corresponding to the location of the pointer moving by drag. And, the controller 180 can control a color of a part (indicated by a reference number 904 in FIG. 9 (b)), which corresponds to the location of the pointer moving by drag in each of the bar type indicators 902, 904, 906 and 908 shown in FIG. 9 (b), to be changed. For another instance, in case that indicators have different colors in regions, respectively, the controller 180 may control a color of a new region, which is newly exposed as the email list moves in the bottom direction, to be changed into a color of an indicator displayed at the location of the pointer moving by drag.

The update time assigned to each of the regions may include a value previously set by a user, by which the update time is non-limited. For instance, the controller 180 determines an interval between a current date and a state of an email located at a top end portion of the email list or an interval between a current date and a most recently updated date and is then able to control an update interval appropriate for each region to be assigned to match the corresponding interval. For instance, referring to FIG. 9 (b), a common difference (e.g., a common difference '2' applying to 1, 3 and 5) or a common ratio (not shown in the drawing) may apply to the update time assigned to the remaining regions except the region having 'all reception' assigned thereto.

Figure 10:
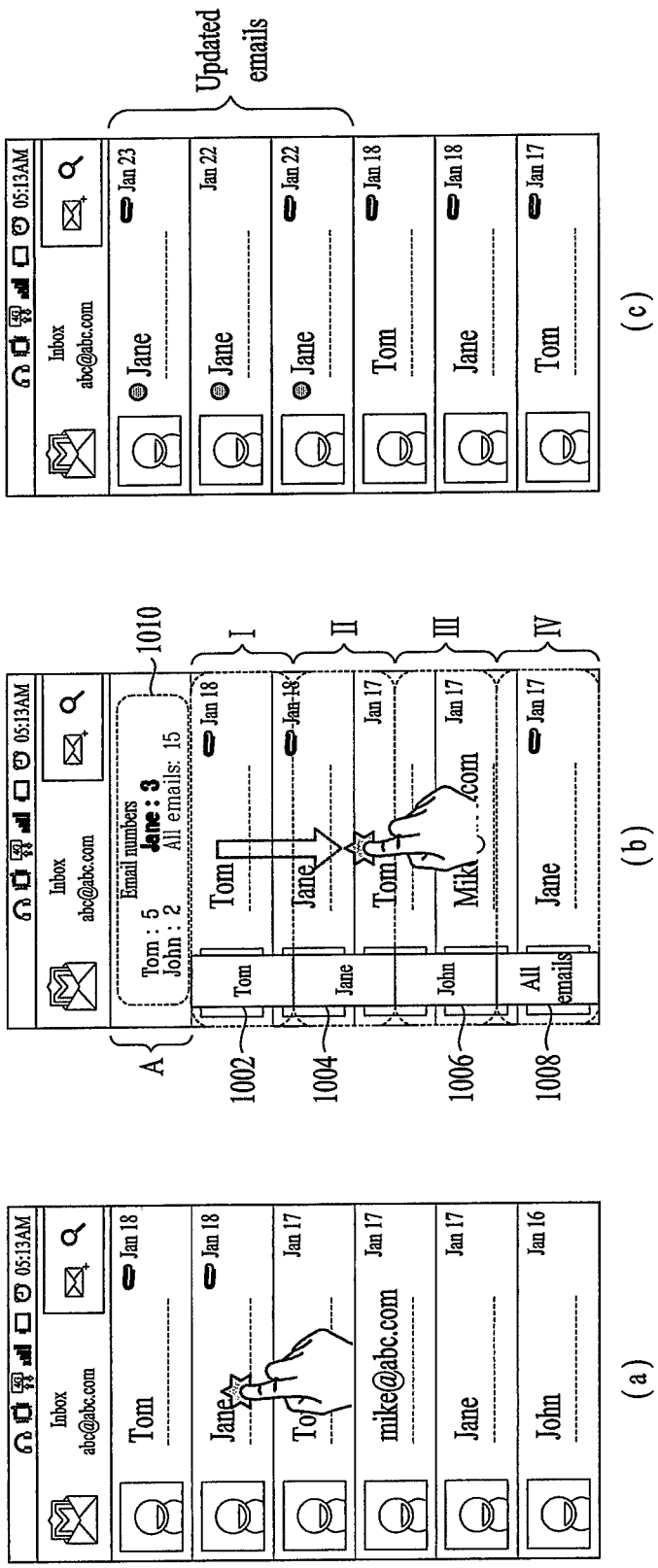
FIG. 10 is a diagram for one example of updating an email received from a specific counterpart only.

FIG. 10 is a diagram for one example of updating an email received from a specific counterpart only. While a top end portion of an email list is displayed, referring to FIG. 10 (a) and FIG. 10 (b), if a drag input of intending to scroll the email list in a top direction is received, the controller 180 can control the display unit 151 to be partitioned into a plurality of regions. In particular, as the email list moves in a bottom direction, if a new region A is exposed at an email list displayed location, the controller 180 partitions a remaining region except the new region A into a plurality of regions I to IV and is then able to assign specific counterparts to a plurality of the regions, respectively. For instance, according to the example shown in FIG. 10 (b), the display unit 151 includes 4 regions to which 'Tom', 'Jane', 'John' and 'All emails' are assigned, respectively.

Through the new region A, which is newly exposed as the email list moves in the bottom direction, the controller 180 can control an update reference, which is estimated as selected in accordance with a location of a pointer, a number of emails, which are estimated as received per update reference, and the like to be displayed. For instance, according to the example shown in FIG. 10 (b), a message 1010 is displayed on the new region A to indicate the following. First of all, if 'Tom' is selected, the receivable email number is 5. Secondly, if 'Jane' is selected, the receivable email number is 3. Thirdly, if 'John' is selected, the receivable email number is 2. Finally, if 'All emails' is selected, the receivable email number is 15.

The controller 180 indicates the number of emails estimated as received per update reference through the new region A and is also able to control an update reference, which corresponds to a current location of the pointer, to be identifiably displayed. For instance, referring to FIG. 10 (b), the controller 180 can represent the update reference 'Jane' corresponding to a current location of the pointer in bold letters.

Thereafter, if the pointer is released, the drag input is ended. If the drag input is ended, the controller 180 can control an email, which is received from a counterpart assigned to the region corresponding to a drag input end location (i.e., a pointer released location), to be updated only. For instance, if the pointer is released from the region II indicating 'Jane', referring to FIG. 10 (c), the controller 180 can control an email, which is sent to a user by Jane, to be received from the email server only. In particular, even if a plurality of counterparts newly send emails to the user, the controller 180 can control the email, which is newly sent from the counterpart designated by a drag input, to be received only.

If the pointer is released from the region I indicating Tom, the controller 180 can control the email, which is newly sent to the user by Tom, to be received from the email server only. If the pointer is released from the region III indicating Tom, the controller 180 can control the email, which is newly sent to the user by John, to be received from the email server only. Moreover, if the pointer is released from the region IV indicating 'reception of all emails', the controller 180 may control all emails, which are newly sent to the user, to be received from the email server.

In order to enable a user to recognize the counterpart assigned to each region, the controller 180 can control an indicator indicating the counterpart assigned to each of the regions to be displayed on the display unit 151. According to the example shown in FIG. 10 (b), indicators 1002, 1004, 1006 and 1008 of bar types displayed on one side of the display unit 151 indicate the counterparts assigned to the regions, respectively. Moreover, according to the example shown in FIG. 10 (b), names of the counterparts are displayed on the indicators 1002, 1004, 1006 and 1008 of the bar types, respectively. Alternatively, email addresses of the counterparts may be displayed on the indicators 1002, 1004, 1006 and 1008 of the bar types, respectively.

Moreover, the controller 180 can control the region, which corresponds to the location of the pointer moving by drag, to be identifiably displayed. For instance, the controller 180 may change a color of the region corresponding to the location of the pointer moving by drag. And, the controller 180 can control a color of a part (indicated by a reference number 1004 in FIG. 10 (b)), which corresponds to the location of the pointer moving by drag in each of the bar type indicators 1002, 1004, 1006 and 1008 shown in FIG. 10 (b), to be changed. For another instance, in case that the indicators have different colors in the regions, respectively, the controller 180 may control a color of a new region, which is newly exposed as the email list moves in the bottom direction, to be changed into a color of an indicator displayed at the location of the pointer moving by drag.

The counterpart assigned to each of the regions may be previously set by a user, by which the counterpart is non-limited. For instance, the controller 180 analyzes emails, which were received by a user before the mail list is updated, and is then able to assign counterparts to the regions in order of a counterpart having sent the most emails, respectively.

Alternatively, if an update of the email list is requested (i.e., if a drag input is received), the controller 180 obtains a list of counterparts, who have sent new mails, from the email server and may be then able to assign the counterparts to the regions in order of the counterpart having sent the most emails, respectively.

For another instance, the controller 180 selectively chooses a counterpart having the highest frequency of calls with a user or a counterpart having the highest frequency of message transmissions to a user and may be then able to assign a counterpart to each of the regions in order of higher call frequency or higher message transmission frequency or in order of a most recently called counterpart or a most recently message sending counterpart. Yet, in this case, it may be necessary for an email address of a counterpart, who has participated in the call or message transmission, to be registered at the memory 160 (e.g., a phonebook).

FIG. 10 shows one example that specific counterparts are assigned to the regions of the display unit 151, respectively. On the other hand, the mobile terminal 100 according to the present invention may control a contact group to be assigned to each region of the display unit 151.

For instance, FIG. 11 is a diagram for one example of updating an email received from a specific contact group only. While a top end portion of an email list is displayed, referring to FIG. 11 (a) and FIG. 11 (b), if a drag input of intending to scroll the email list in a top direction is received, the controller 180 can control the display unit 151 to be partitioned into a plurality of regions. In particular, as the email list moves in a bottom direction, if a new region A is exposed at an email list displayed location, the controller 180 partitions a remaining region except the new region A into a plurality of regions I to IV and is then able to assign contact groups to a plurality of the regions, respectively. For instance, according to the example shown in FIG. 11 (b), 'Friends', 'Family', 'Company' and 'All emails' are assigned to the 4 regions I to IV, respectively.

Through the new region A, which is newly exposed as the email list moves in the bottom direction, the controller 180 can control an update reference, which is estimated as selected in accordance with a location of a pointer, a number of emails, which are estimated as received per update reference, and the like to be displayed. For instance, according to the example shown in FIG. 11 (b), a message 1010 is displayed on the new region A to indicate the following. First of all, if 'Friends' is selected, the receivable email number is 5. Secondly, if 'Family' is selected, the receivable email number is 3. Thirdly, if 'Company' is selected, the receivable email number is 5. Finally, if 'All emails' is selected, the receivable email number is 15.

The controller 180 indicates the number of emails estimated as received per update reference through the new region A and is also able to control an update reference, which corresponds to a current location of the pointer, to be identifiably displayed. For instance, referring to FIG. 11 (b), the controller 180 can represent the update reference 'Family' corresponding to a current location of the pointer in bold letters.

Thereafter, if the pointer is released, the drag input is ended. If the drag input is ended, the controller 180 can control an email, which is received from a contact group assigned to the region corresponding to a drag input end location (i.e., a pointer released location), to be updated only. For instance, if the pointer is released from the region II indicating 'Family', the controller 180 can control an email, which is sent by a counterpart belonging to the contact group called 'Family', to be received from the email server only. For instance, if counterparts belonging to the contact group include 'Mother', 'Father' and 'Sister', referring to FIG. 11 (c), the controller 180 may be able to update the email list by receiving emails sent by the counterparts called 'Mother', 'Father' and 'Sister' from the email server.

Figure 12:
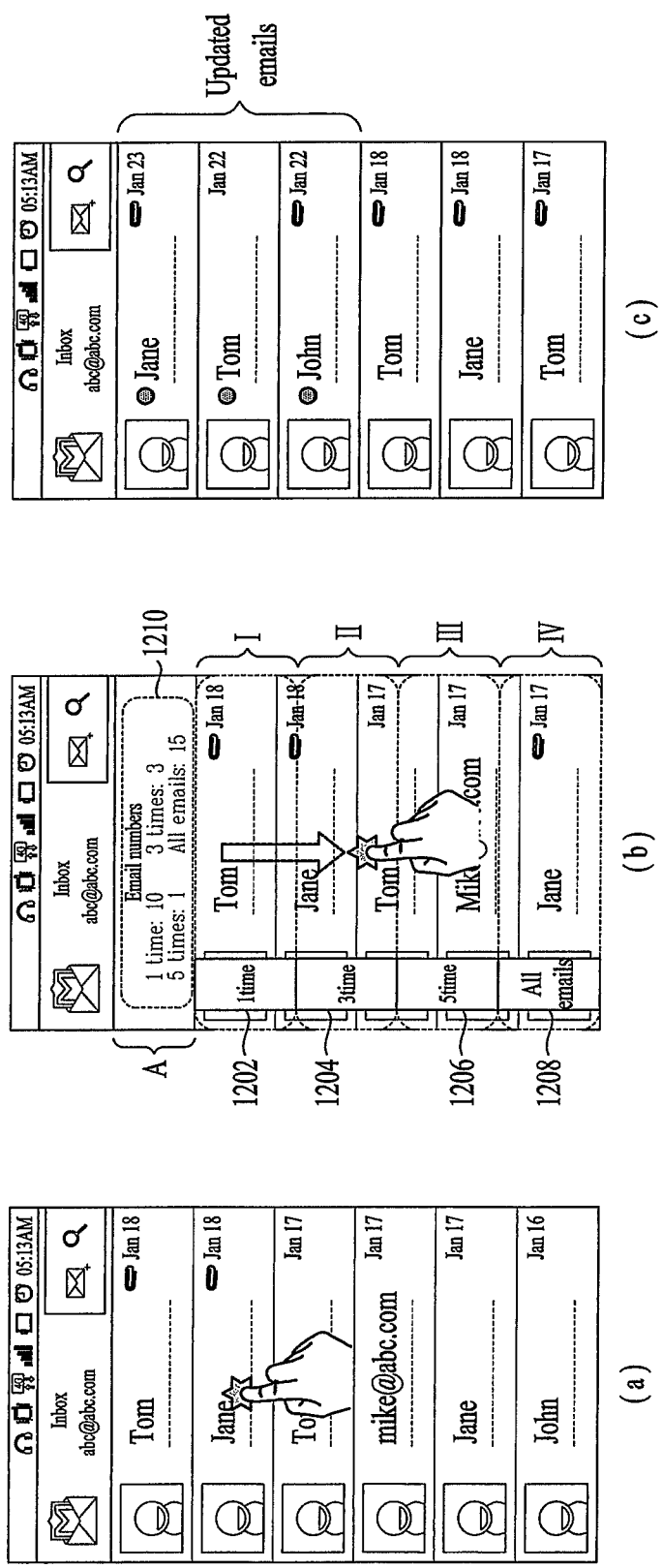
FIG. 12 is a diagram for one example of updating an email received only from a counterpart having a contact frequency equal to or greater than a prescribed count.

FIG. 12 is a diagram for one example of updating an email received only from a counterpart having a contact frequency equal to or greater than a prescribed count. While a top end portion of an email list is displayed, referring to FIG. 12 (a) and FIG. 12 (b), if a drag input of intending to scroll the email list in a top direction is received, the controller 180 can control the display unit 151 to be partitioned into a plurality of regions. In particular, as the email list moves in a bottom direction, if a new region A is exposed at an email list displayed location, the controller 180 partitions a remaining region except the new region A into a plurality of regions I to IV and is then able to assign contact frequency counts to a plurality of the regions, respectively. In this case, the contact frequency count may mean a count of calls made to a user, a count of calls made by a user, a count of texts sent to a user, a count of texts received from a user or a sum of at least two of the listed items. For instance, according to the example shown in FIG. 12 (b), the display unit 151 includes 4 regions to which '1 time', '3 times', '5 times' and 'All emails' are assigned, respectively.

Through the new region A, which is newly exposed as the email list moves in the bottom direction, the controller 180 can control an update reference, which is estimated as selected in accordance with a location of a pointer, a number of emails, which are estimated as received per update reference, and the like to be displayed. For instance, according to the example shown in FIG. 12 (b), a message 1210 is displayed on the new region A to indicate the following. First of all, if '1 time' is selected, the receivable email number is 10. Secondly, if '3 times' is selected, the receivable email number is 3. Thirdly, if '5 times' is selected, the receivable email number is 1. Finally, if 'All emails' is selected, the receivable email number is 15.

The controller 180 indicates the number of emails estimated as received per update reference through the new region A and is also able to control an update reference, which corresponds to a current location of the pointer, to be identifiably displayed. For instance, referring to FIG. 12 (b), the controller 180 can represent the update reference '3 times' corresponding to a current location of the pointer in bold letters.

Thereafter, if the pointer is released, the drag input is ended. If the drag input is ended, the controller 180 can control an email, which is received from a counterpart satisfying the contact frequency count assigned to the region corresponding to a drag input end location (i.e., a pointer released location), to be updated only. For instance, if the pointer is released from the region II indicating '3 times', the controller 180 may control an email, which is sent by a counterpart having the contact frequency count equal to or greater than 3 times, to be received from the email server only. In particular, even if a plurality of counterparts newly send emails to the user, the controller 180 can control the email, which is newly sent by the counterpart satisfying a contact count designated by a drag input, to be received only.

If the pointer is released from the region I indicating 1 time, the controller 180 may control the email, which is sent by the counterpart having the contact frequency count equal to or greater than 1 time, to be received only. If the pointer is released from the region III indicating 5 times, the controller 180 may control the email, which is sent by the counterpart having the contact frequency count equal to or greater than 5 times, to be received only. Moreover, if the pointer is released from the region IV indicating 'reception of all emails', the controller 180 may control all emails, which are newly sent to the user, to be received from the email server irrespective of whether the contact frequency count is satisfied.

In order to enable a user to recognize the counterpart assigned to each region, the controller 180 can control an indicator indicating the contact frequency count assigned to each of the regions to be displayed on the display unit 151. According to the example shown in FIG. 12 (*b*), indicators 1202, 1204, 1206 and 1208 of bar types displayed on one side of the display unit 151 indicate the contact frequency counts assigned to the regions, respectively.

Moreover, the controller 180 can control the region, which corresponds to the location of the pointer moving by drag, to be identifiably displayed. For instance, the controller 180 may change a color of the region corresponding to the location of the pointer moving by drag. And, the controller 180 can control a color of a part (indicated by a reference number 1204 in FIG. 12 (*b*)), which corresponds to the location of the pointer moving by drag in each of the bar type indicators 1202, 1204, 1206 and 1208 shown in FIG. 12 (*b*), to be changed. For another instance, in case that the indicators have different colors in the regions, respectively, the controller 180 may control a color of a new region, which is newly exposed as the email list moves in the bottom direction, to be changed into a color of an indicator displayed at the location of the pointer moving by drag.

The contact frequency count assigned to each of the regions may be previously set by a user, by which the contact frequency count is non-limited. For instance, the controller 180 analyzes user's call or message transmission/reception logs and may be then able to assign appropriate contact frequency counts to the regions, respectively.

Figure 13:
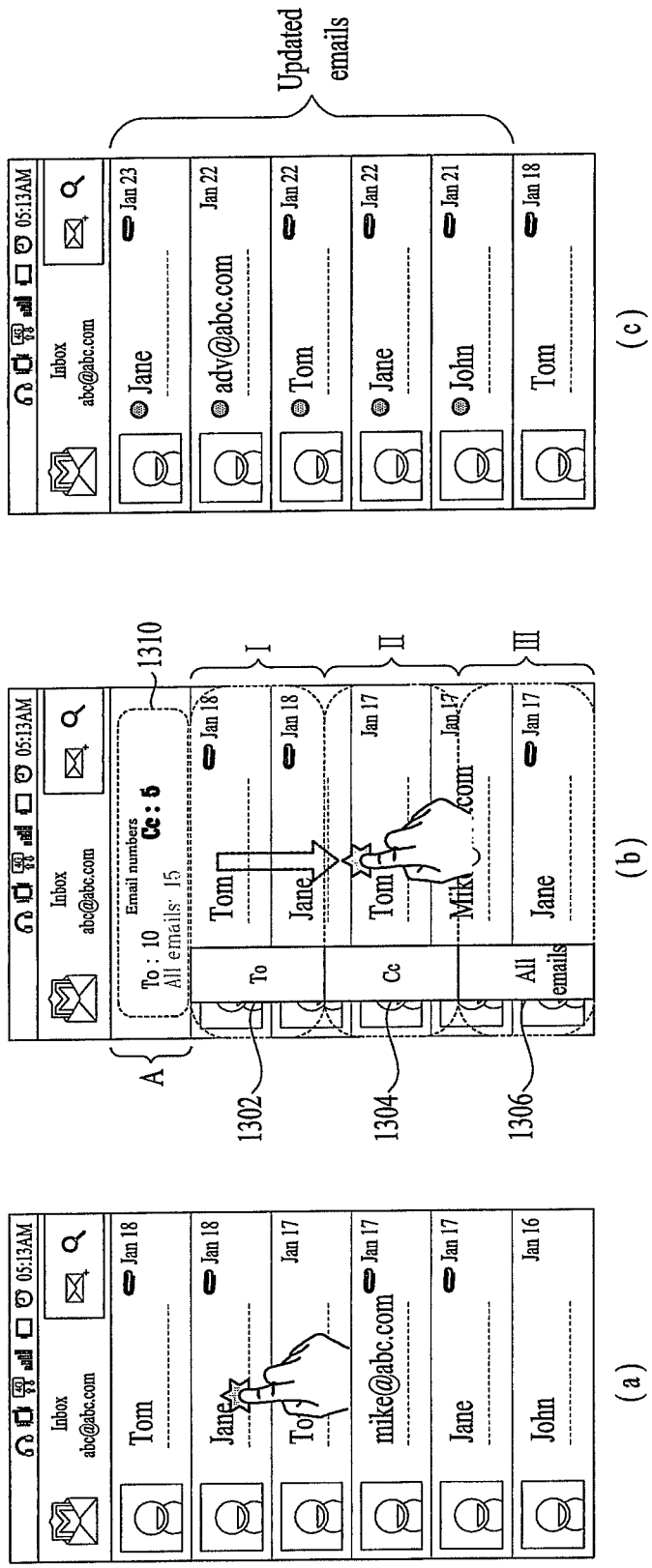
FIG. 13 is a diagram for one example of updating an email selectively in accordance with a user position.

FIG. 13 is a diagram for one example of updating an email selectively in accordance with a user position. While a top end portion of an email list is displayed, referring to FIG. 13 (*a*) and FIG. 13 (*b*), if a drag input of intending to scroll the email list in a top direction is received, the controller 180 can control the display unit 151 to be partitioned into a plurality of regions. In particular, as the email list moves in a bottom direction, if a new region A is exposed at an email list displayed location, the controller 180 partitions a remaining region except the new region A into a plurality of regions I to III and is then able to assign user positions as recipients to a plurality of the regions, respectively. In this case, the user position may indicate whether the user is designated as a recipient (To) of an email or as a carbon copy (cc) of an email. For instance, according to the example shown in FIG. 13 (*b*), the display unit 151 includes 3 regions to which 'Recipient (To)', 'Carbon copy (Cc)' and 'All emails' are assigned, respectively.

Through the new region A, which is newly exposed as the email list moves in the bottom direction, the controller 180 can control an update reference, which is estimated as selected in accordance with a location of a pointer, a number of emails, which are estimated as received per update reference, and the like to be displayed. For instance, according to the example shown in FIG. 13 (*b*), a message 1310 is displayed on the new region A to indicate the following. First of all, if 'Recipient (To)' is selected, the receivable email number is 10. Secondly, if 'Carbon copy (Cc)' is selected, the receivable email number is 5. Finally, if 'All emails' is selected, the receivable email number is 15.

The controller 180 indicates the number of emails estimated as received per update reference through the new region A and is also able to control an update reference, which corresponds to a current location of the pointer, to be identifiably displayed. For instance, referring to FIG. 13 (*b*), the controller 180 can represent the update reference 'Cc' corresponding to a current location of the pointer in bold letters.

Thereafter, if the pointer is released, the drag input is ended. If the drag input is ended, the controller 180 can control an email, which is received as a user position assigned to the region corresponding to a drag input end location (i.e., a pointer released location), to be updated only. For instance, if the pointer is released from the region II indicating the carbon copy, the controller 2180 may control an email having a user set to the carbon copy to be received from the email server only.

If the pointer is released from the region I indicating a recipient, the controller 180 may control the email, which has a user set to a recipient, to be received from the email server only. If the pointer is released from the region III indicating 'reception of all emails', the controller 180 may control all emails, which are sent to the user, to be received from the email server.

In order to enable a user to recognize the counterpart assigned to each region, the controller 180 can control an indicator indicating a user position assigned to each of the regions to be displayed on the display unit 151. According to the example shown in FIG. 13 (*b*), indicators 1302, 1304 and 1306 of bar types displayed on one side of the display unit 151 indicate the user positions assigned to the regions, respectively.

Moreover, the controller 180 can control the region, which corresponds to the location of the pointer moving by drag, to be identifiably displayed. For instance, the controller 180 may change a color of the region corresponding to the location of the pointer moving by drag. And, the controller 180 can control a color of a part (indicated by a reference number 1306 in FIG. 13 (*b*)), which corresponds to the location of the pointer moving by drag in each of the bar type indicators 1302, 1304 and 1306 shown in FIG. 13 (*b*), to be changed. For another instance, in case that the indicators have different colors in the regions, respectively, the controller 180 may control a color of a new region, which is newly exposed as the email list moves in the bottom direction, to be changed into a color of an indicator displayed at the location of the pointer moving by drag.

The user position assigned to each of the regions may be previously set by a user, by which the user position is non-limited. For instance, the controller 180 analyzes user's call or message transmission/reception logs and may control appropriate user positions to be assigned to the regions, respectively.

According to the example shown in FIG. 13, whether a user is designated as a recipient or a carbon copy is used as a criterion for determining a user position. Yet, it is able to determine a user position using a different criterion. For instance, the controller 180 may be able to determine a user position depending on whether a user is singly designated as a recipient of an email or whether a plurality of characters including a user are designated as recipients of an email. For another instance, the controller 180 may be able to determine a user position depending on whether a user is singly designated as a carbon copy of an email or whether a plurality of characters including a user are designated as recipients of an email.

According to the examples shown in FIGS. 7 to 13, it is able to determine an update reference in accordance with a location at which a drag input is ended. Unlike the examples shown in the drawings, the mobile terminal 100 according to the present invention can control an update reference to be determined in accordance with the number of pointer(s) used in applying a drag input. For instance, if a drag input is applied using a single pointer, the controller 180 may control an email, which is received from a $1^{st}$ counterpart, to be updated only. For another instance, if a drag input is applied using two pointers, the controller 180 may control an email, which is received from a $2^{nd}$ counterpart, to be updated only.

Like the examples shown in FIGS. 7 to 13, the controller 180 can update an email list based on one of a maximum email number, a maximum data reception capacity, an update time, a specific counterpart, a specific contact group, a contact frequency and a user position. In this case, the controller 180 can apply one of the above-listed items in accordance with a setting value previously determined by a user before an update of the email list. For instance, if an email list is set to be updated in accordance with an update time, the embodiment described with reference to FIG. 9 may apply to the mobile terminal 100 according to the present invention. On the other hand, whether to use a specific one of the above-listed items may vary depending on a user's touch input type. This shall be described in detail with reference to the accompanying drawings later. For clarity of the following description, such a reference as a maximum data reception capacity, an update time, a specific counterpart, a specific contact group, a contact frequency, a user position or the like shall be named 'upper reference'. And, a reference determined in accordance with an end location of a drag input shall be named 'lower reference'.

Before an email list is updated, a user may be able to determine what kind of upper reference will be selected from the above-listed upper references. For instance, if a drag input in a direction different from that of a drag input for displaying an email list in a length direction is received, the controller 180 can control an upper reference to be changed based on the received drag input. In particular, if a drag input in a preset direction is received within a preset region, the controller 180 can control an upper reference to be changed.

For instance, FIG. 14A is a diagram for one example for a user to change an upper reference. While an email list is displayed, if a drag input in a preset direction is applied within a preset region, the controller 180 can control an upper reference to be changed. For instance, if a drag input in a right or left direction is applied within a region B (hereinafter named 'category guide region') for guiding a user in a category of a currently displayed email list [FIG. 14A (a)], the controller 180 can change an upper reference [FIG. 14A (b), FIG. 14A (c)]. According to the example shown in FIG. 14A (b) and FIG. 14A (c), a selected upper reference item is outlined with a thick line. Regarding the upper reference items shown in FIG. 14A (b) and FIG. 14A (c), an item 'number' 1402 may be provided to set a maximum email number as an update reference. An item 'capacity' 1404 may be provided to set a data reception capacity as an update reference. An item 'time' 1406 may be provided to set an update time as an update reference. An item 'character' 1408 may be provided to set a specific counterparty as an update reference. An item 'group' 1410 may be provided to set a specific contact group as an update reference. And, an item 'call frequency' 1412 may be provided to set a contact frequency as an update reference. According to the example shown in FIG. 14A (b), the item 'time' 1406 is selected as an update reference. According to the example shown in FIG. 14A (c), as a moving distance of a pointer increases, an update reference is changed into the item 'character' 1408.

A user input for selecting an upper reference is non-limited to the drag input shown in FIG. 14A. Alternatively, if buttons for selecting an upper reference are displayed on the display unit 151, a user may be able to select the upper reference by touching one of the displayed buttons.

According to the example shown in FIG. 14A, in response to a user's drag input, an upper reference is changed. For another example, if a preset region is touched, the controller 180 displays upper reference items and is then able to control an email list to be touched based on the upper reference item located at a start timing point of a user's drag input.

Figure 14B:
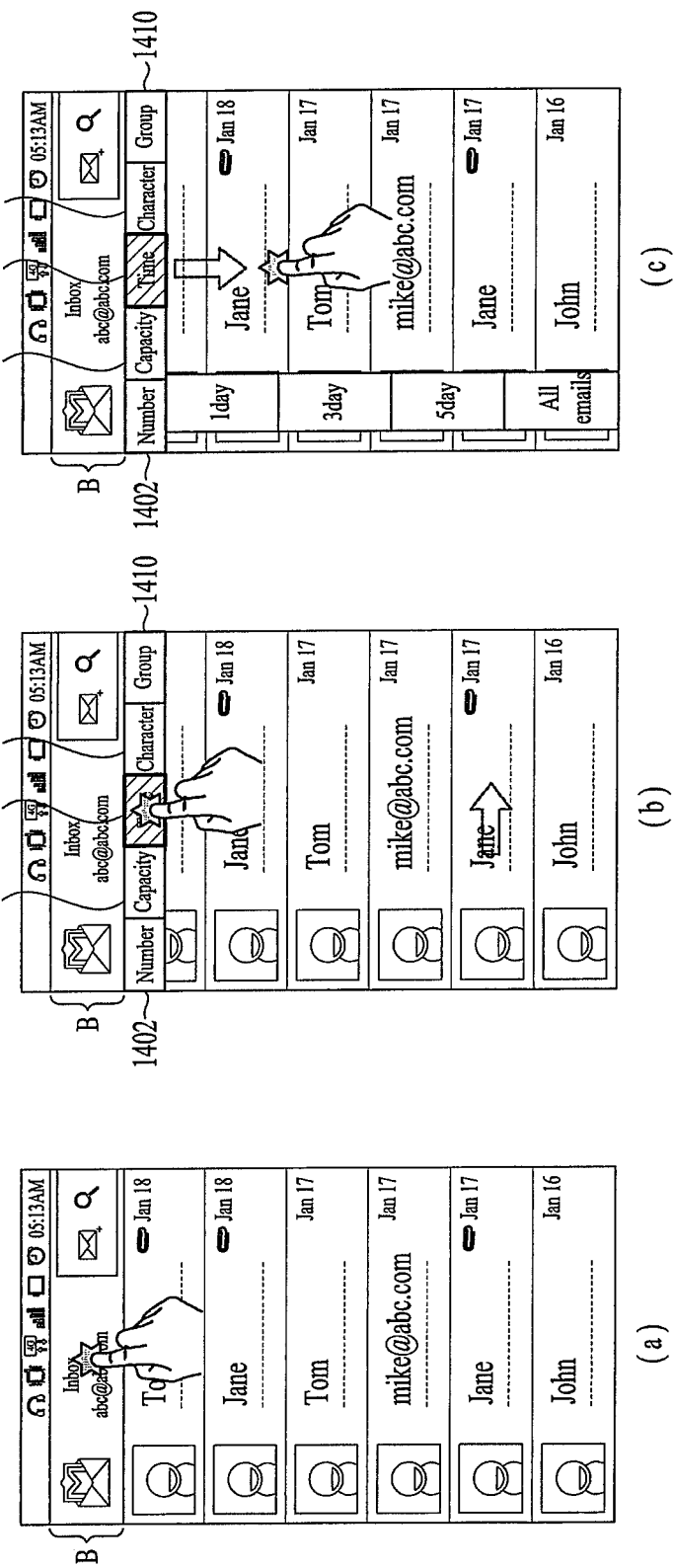
FIG. 14B is a diagram for one example of updating an email list based on an upper reference item located at a timing point of a drag input start.

For instance, FIG. 14B is a diagram for one example that an email list is updated based on an upper reference item located at a start timing point of a drag input. Referring to FIG. 14B, if a category guide region B is touched [FIG. 14B (a)], the controller 180 can control upper reference items 1402, 1404, 1406, 1408 and 1410 to be displayed [FIG. 14B (b)]. If a pointer touches one of the upper reference items 1402, 1404, 1406, 1408 and 1410 and is then dragged to move in a prescribed direction, the controller 180 can control an email list to be updated based on the upper reference item corresponding to a start location of the drag input. For instance, since the drag input started from the item 'time' 1406 [FIG. 14B (b)], the controller 180 may select an update time as an upper reference [FIG. 14B (c)].

According to another embodiment, the controller 180 may determine an upper reference in accordance with the number of pointer(s) with which the display unit 151 is touched.

Figure 15A:
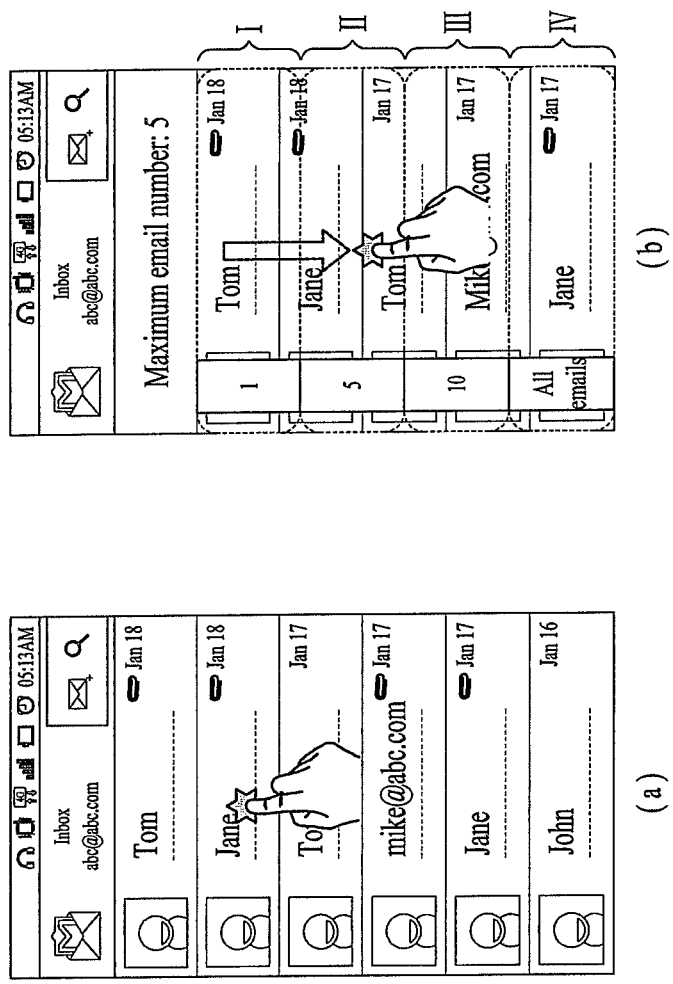
FIG. 15A and FIG. 15B are diagrams for examples of determining an upper reference depending on the number of pointers touching a display unit.
Figure 15B:
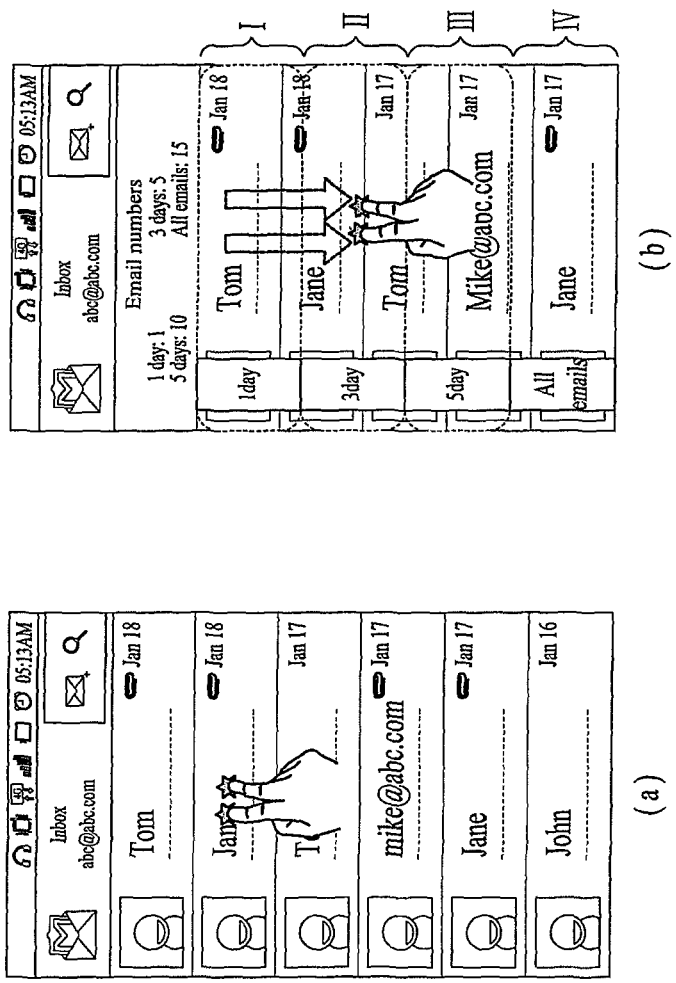

For instance, FIG. 15A and FIG. 15B are diagrams for examples of determining an upper reference depending on the number of pointer(s) touching a display unit. While a top end portion of an email list is displayed, referring to FIG. 15A (a) and FIG. 15A (b), if a drag input for scrolling to move the email list in a top direction is received through a single pointer, the controller 180 selects a $1^{st}$ upper reference and is then able to control lower references subordinate to the $1^{st}$ upper reference to be displayed on regions of the display unit 151, respectively. According to the example shown in FIG. 15A (b), as a maximum email number is selected as the $1^{st}$ upper reference, the maximum receivable email numbers such as '1', '5', '10' and 'All emails' are assigned to the regions I to IV of the display unit 151, respectively.

While a top end portion of an email list is displayed, referring to FIG. 15B (a) and FIG. 15A (b), if a drag input for scrolling to move the email list in a top direction is received through two pointers, the controller 180 selects a $2^{nd}$ upper reference and is then able to control lower references subordinate to the $2^{nd}$ upper reference to be displayed on regions of the display unit 151, respectively. According to the example shown in FIG. 15B (b), as an update time is selected as the $2^{nd}$ upper reference, update times such as '1 day', '3 days', '5 days' and 'All emails' are assigned to the regions I to IV of the display unit 151, respectively.

Like the examples shown in FIG. 15A and FIG. 15B, the controller 180 can determine an upper reference, which is to be applied in case of an update of an email list, in accordance with the number of pointer(s) with which the display unit 151 is touched. FIG. 15A shows one example of a case that the display unit 151 is touched with a single pointer. And, FIG. 15B shows one example of a case that the display unit 151 is touched with two pointers. If the display unit 151 is touched with pointers of which number is greater than that of one of the examples shown in the drawings, it is a matter of course that another upper references can be selected.

If a drag input is received, the mobile terminal 100 partitions the display unit 151 into a plurality of cells consisting of horizontal rows and vertical columns and is then able to assign an upper reference and a selected lower reference of the upper reference to one of a prescribed row and column and the other, respectively.

For instance, FIG. 16 is a diagram for one example of when a display unit is partitioned into a plurality of cells, assigning an upper reference and a selected lower reference to a vertical column and a horizontal row, respectively. While a top end portion of an email list is displayed, referring to FIG. 16 (*a*) and FIG. 16 (*b*), if a drag input of intending to scroll the email list in a top direction is received, the controller 180 can control the display unit 151 to be partitioned into a plurality of regions. In particular, as the email list moves in a bottom direction, if a new region A is exposed at an email list displayed location, the controller 180 is able to a remaining region except the new region A to be portioned into a plurality of regions (1 to 3, I to IV). Having partitioned the remaining region with horizontal and vertical lines, the controller 180 assigns upper references to the vertical columns 1 to 3 and also assigns lower references to the horizontal rows I to IV, respectively. Moreover, through the new region A, which is newly exposed as the email list moves in the bottom direction, the controller 180 can control indicators 1602, 1604 and 1606 to be displayed to indicate the upper references respectively assigned to the vertical columns 1 to 3. For instance, referring to FIG. 16 (*b*), a maximum email number is assigned as an upper reference to the $1^{st}$ column 1, an update time is assigned as an upper reference to the $2^{nd}$ column 2, and a counterpart is assigned as an upper reference to the $3^{rd}$ column 3.

Lower references according to the upper reference assigned to each of the columns may be assigned to the rows I to IV, respectively. For instance, '1' may be assigned as a maximum receivable email number to the $1^{st}$ row I of the $1^{st}$ column 1, '1 MBytes' may be assigned as a maximum receivable data capacity to the $1^{st}$ row I of the $2^{nd}$ column 2, and 'Tom' may be assigned as a counterpart to the $1^{st}$ row I of the $3^{rd}$ column 3.

In order to guide a user with lower references indicated by each of the rows I to IV, the controller 180 can control indicators 1612, 1614, 1616 and 1618 to be displayed per row or cell to guide the user with the lower references assigned to the corresponding row or cell.

FIG. 16 (*b*) shows one example that the indicators 1612, 1614, 1616 and 1618 of bar types are displayed on one side of the display unit 151 to indicate lower references assigned to each row. Each time a pointer moves to a different column, the controller 180 can control informations, which are indicated by the indicators 1612, 1614, 1616 and 1618 of the bar types, to be changed. For instance, in case that the pointer is located on the $2^{nd}$ column 2, like the example shown in FIG. 16 (*b*), the controller 180 can control informations, which indicate lower references subordinate to an update reference corresponding to an upper reference assigned to the $2^{nd}$ column, to be displayed through the indicators 1612, 1614, 1616 and 1618, respectively. If the pointer moves to the $3^{rd}$ column 3, like the example shown in FIG. 16 (*c*), the controller 180 can control informations, which indicate lower references subordinate to an update reference corresponding to an upper reference assigned to the $3^{rd}$ column 3, to be displayed through the indicators 1612, 1614, 1616 and 1618, respectively.

Thereafter, as the pointer is released, the drag input is ended. If the drag input is ended, the controller 180 can control the email list to be updated in a manner of applying the upper reference and the lower reference assigned to a region corresponding to a drag input end location (i.e., a pointer released location). For instance, if the drag input is ended on a region (i.e., $3^{rd}$ row 3 of $2^{nd}$ column II) currently touched with the pointer [FIG. 16 (*c*)], the controller 180 may update only an email that is received from the counterpart 'Jane' indicated by the upper reference and the lower reference corresponding to the point released point.

According to the embodiments mentioned in the foregoing description, while a top end portion of an email list is displayed, if a drag input of intending to scroll to move the email list in a top direction is received, the email list can be updated. On the other hand, while a top end portion of an email list is displayed, if a drag input of intending to scroll to move the email list in a bottom direction is received, it is a matter of course that the embodiments mentioned in the foregoing description can apply thereto. Moreover, in case that an email application is run, the mobile terminal 100 according to the present invention can control an email list to be updated as well.

If an event for requesting an update of an email list is triggered, the mobile terminal 100 according to the present invention displays a setting menu for setting an update reference and is then able to determine the update reference based on a user input to the setting menu.

Figure 17:
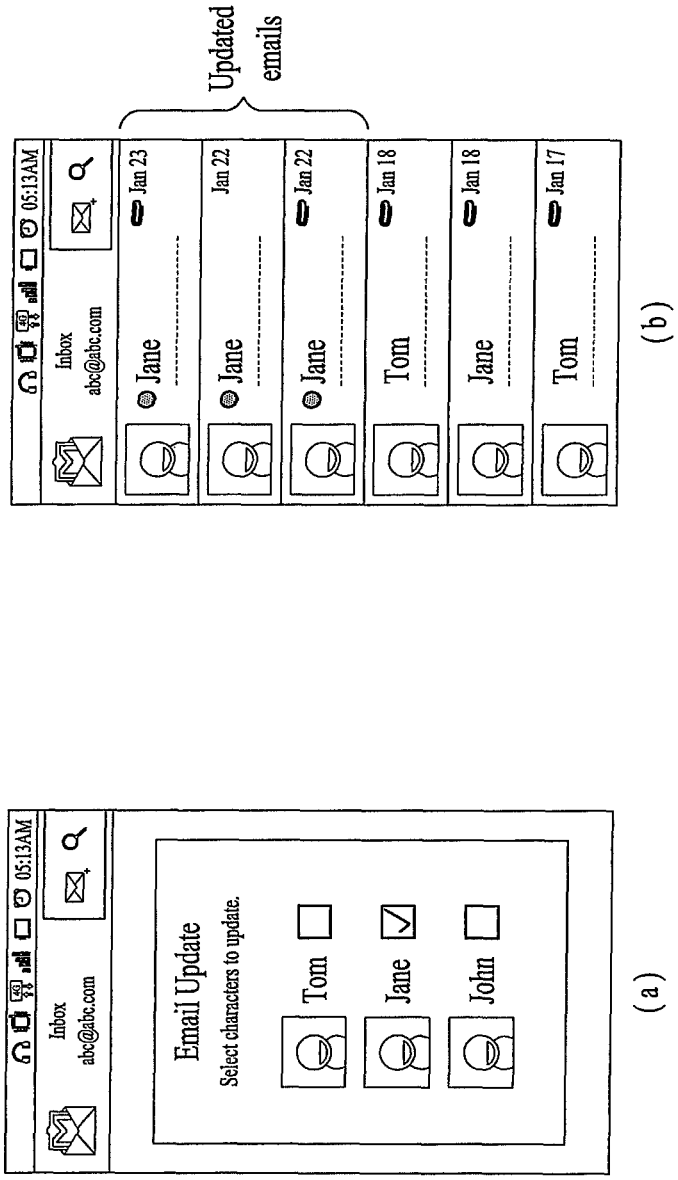
FIG. 17 is a diagram for one example of determining an update reference based on a user input to a setting menu.

For instance, FIG. 17 is a diagram for one example of determining an update reference based on a user input to a setting menu. If an event (e.g., a reception of a user input to update an email list, an action for running an email application, etc.) intending to update an email list is triggered, like the example shown in FIG. 17 (*a*), the controller 180 can control a setting menu, which is provided to set up an update reference applicable to an update, to be displayed. A user is able to determine an update reference, which is to be applied to an update of the email list, through the update reference setting menu. According to the example shown in FIG. 17 (*a*), a specific counterpart is selected as an update reference.

Once the update reference is determined, like the example shown in FIG. 17 (*b*), it is able to update the email list based on the determined update reference.

Although FIG. 17 (*a*) shows one example that the specific counterpart is selected as the update reference through a setting screen, it is a matter of course that at least one of a maximum email number, a received data capacity, an update time, a contact group, a frequency of contacts with an email sending counterpart, and a user position can be determined as an update reference through the setting screen.

Moreover, although a top or bottom end portion of an email list is not displayed currently, if a preset user input is received, the mobile terminal 100 according to the present invention can control the email list to be updated. For instance, if a prescribed email is selected from the email list, the controller 180 may control an email, which is received from a counterpart having sent the selected email, to be updated from an email server only.

For instance, FIG. 18 is a diagram for one example of updating an email newly received from a specific counterpart only. Referring to FIG. 18 (*a*) and FIG. 18 (*b*), as an image region 1810 displayed on a prescribed item of an email list is touched, if a pointer touching the image region 1810 is dragged in a prescribed direction, the controller 180 can update an email, which is newly received from a counterpart having sent a selected email, to be updated from an email server.

In doing so, the controller 180 distinguishes an email designating a user as a recipient and an email designating the user as a carbon copy from each other among emails having sent to the user by a selected counterpart and is then able to control the email, which corresponds to either the recipient or the carbon copy, to be updated only.

For instance, as an image region 1810 displayed on a prescribed item of an email list is touched, if a pointer touching the image region 1810 is dragged in a prescribed direction, referring to FIG. 18 (b), the controller 180 can display a $1^{st}$ region I for receiving only an email having a user designated as a recipient by a selected counterpart, a $2^{nd}$ region II for receiving only an email having the user designated as a carbon copy by the selected counterpart, and a $3^{rd}$ region II for receiving all emails sent to the user by the selected counterpart.

In accordance with a location at which a drag input is ended, the controller 180 can determine an email that should be received from an email server. For instance, if the drag input is ended on the $1^{st}$ region I (i.e., if a pointer is released from the $1^{st}$ region I), the controller 180 may control an email having a user set as a recipient to be received only among emails having sent to the user by a selected counterpart. For another instance, if the drag input is ended on the $2^{nd}$ region I (i.e., if a pointer is released from the $2^{nd}$ region II), the controller 180 may control an email having a user set as a carbon copy to be received only among emails having sent to the user by a selected counterpart. For further instance, if the drag input is ended on the $3^{rd}$ region III (i.e., if a pointer is released from the $3^{rd}$ region III), the controller 180 may control all emails, which are sent to a user by a selected counterpart, to be received.

FIG. 18 (c) shows one example that an email sent by a selected counterpart 'Jane' is updated only.

Besides, it is able to simultaneously update emails newly received from a plurality of counterparts using a multi-touch [not shown in the drawing].

According to the example shown in FIG. 18, a user input for updating an email received from a specific counterpart only is applied in a manner of touching an image region with a pointer and then dragging the pointer in a bottom direction, by which the user input is non-limited. Alternatively, an email received from a specific counterpart can be updated only by a user input of a type different from that shown in the drawing.

The controller 180 may assign contents, which are different from those assigned to the $1^{st}$ to $3^{rd}$ regions I to III shown in FIG. 18, to the $1^{st}$ to $3^{rd}$ regions I to III, respectively. For instance, the controller 180 may assign the $1^{st}$ region I as a region for receiving an email sent to the controller 180 only by a selected counterpart. The controller 180 may assign the $2^{nd}$ region II as a region for receiving an email sent by a selected counterpart to a plurality of counterparts including the controller 180. And, the controller 180 may assign the $3^{rd}$ region III as a region for receiving all emails sent to a user by a selected counterpart.

The mobile terminal 100 according to the present invention may display information indicating a presence or non-presence of an email newly received from a counterpart selected by a user before updating an email list.

Figure 19:
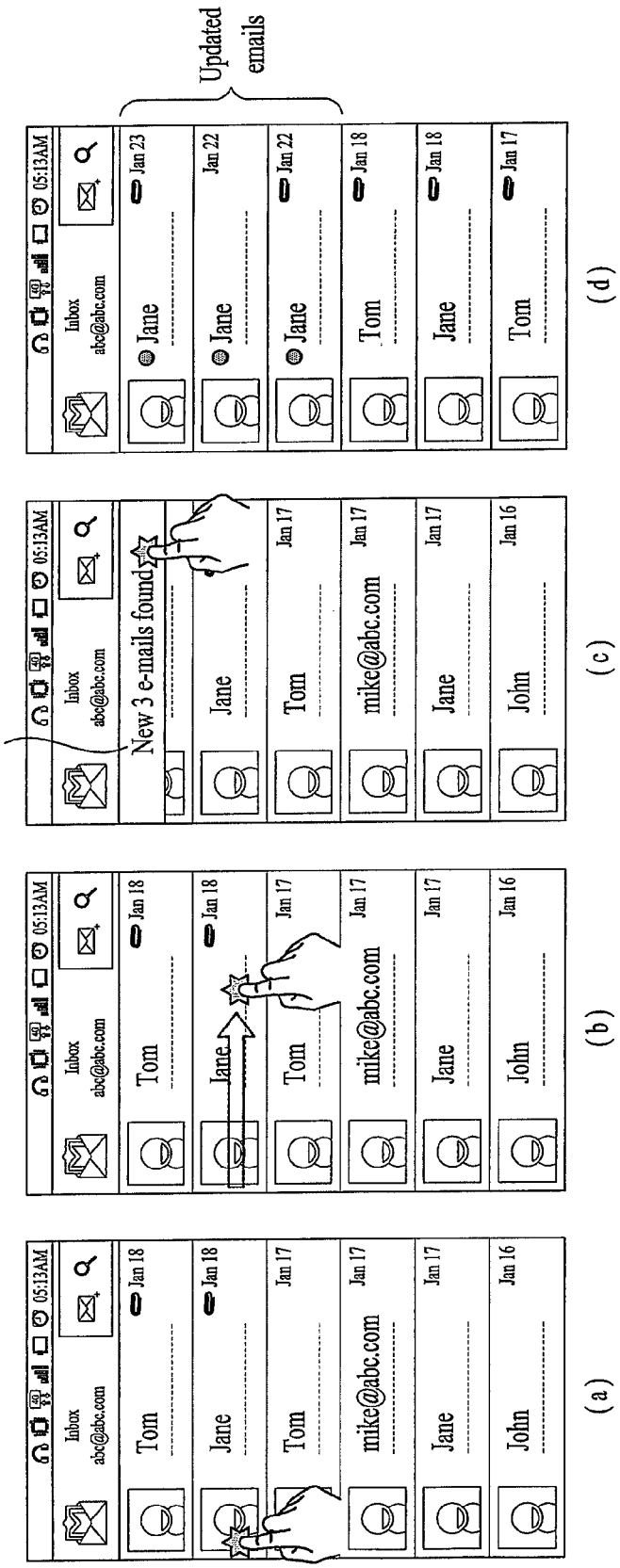
FIG. 19 is a diagram for one example of displaying information indicating a presence or non-presence of an email newly received from a selected counterpart.

For instance, FIG. 19 is a diagram for one example of displaying information indicating a presence or non-presence of an email newly received from a selected counterpart. Referring to FIG. 19 (a) and FIG. 19 (b), after at least one item displayed on an email list has been touched with a pointer, if a drag input of moving the pointer in a prescribed direction is received, the controller 180 can check from an email server whether an email newly received from a counterpart having sent a selected email exists. If the email newly received from the counterpart having sent the selected email does not exist, the controller 180 can control a message, which indicates that the email newly received from the counterpart having sent the selected email does not exist, to be outputted. On the contrary, if the email newly received from the counterpart having sent the selected email exists, referring to FIG. 19 (c), the controller 180 can control a message 1910, which indicates that the email newly received from the counterpart having sent the selected email exists, to be displayed.

Thereafter, if a preset user input (e.g., a touch to the message, an action of dragging the pointer touching the message in a prescribed direction, etc.) is applied to the message indicating that the email newly received from the counterpart having sent the selected email exists, referring to FIG. 19 (d), the controller 180 can control the email, which is newly received from the counterpart having sent the selected email, to be updated.

Besides, it is a matter of course that emails newly received from a plurality of counterparts can be simultaneously checked using a multi-touch.

If a keyword is inputted, the mobile terminal 100 according to the present invention may control an email, which matches the keyword, to be updated only. In particular, if a keyword is included in a text content of an email or an information (e.g., a name of a counterpart, an email address of a counterpart, etc.) of a counterpart having sent an email includes a keyword, the controller 180 may control the corresponding emails to be updated only.

Figure 20:
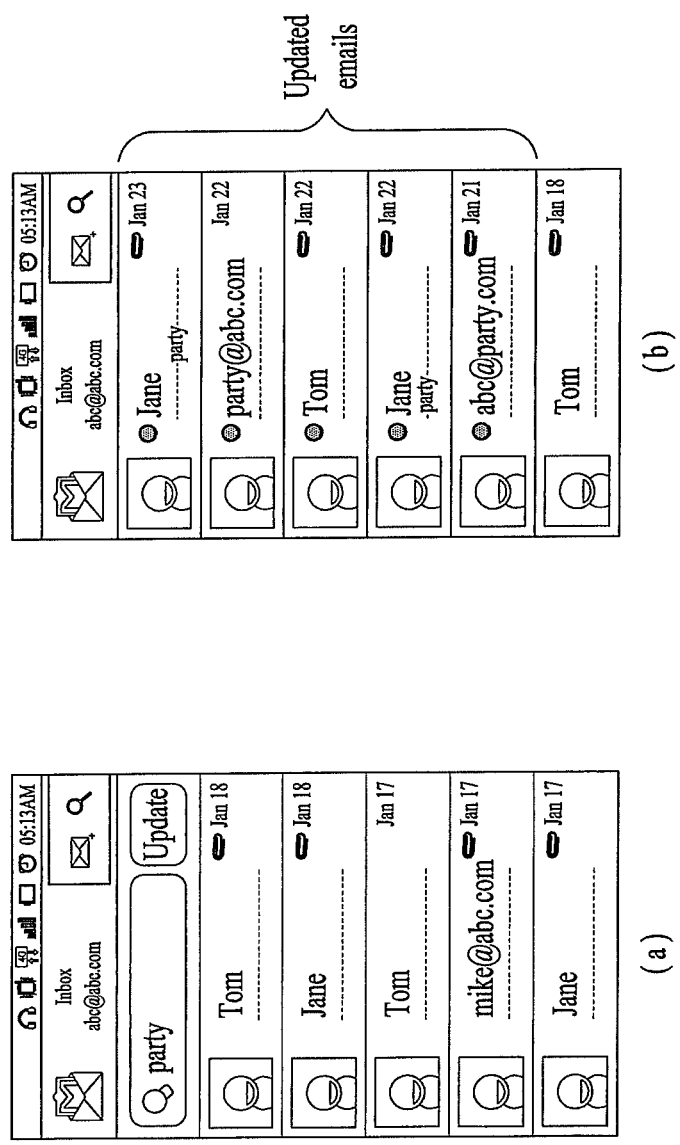
FIG. 20 is a diagram for one example of updating an email matching a keyword only.

For instance, FIG. 20 is a diagram for one example of updating an email matching a keyword only. A user is able to input a keyword, which is to be used for an update of an email list, through a search window displayed through the display unit 151. FIG. 20 (a) shows one example that a word 'party' is set as a keyword.

Thereafter, if a user input for requesting an update is received, referring to FIG. 20 (b), the controller 180 can update an email having a word 'party' included in a title, an email having a word 'party' included in a text content, an email having a word 'party' included in a name or email address of a counterpart and the like.

While an email list is displayed, if a preset user input is applied to an indicator indicating that a file is attached to a corresponding email, the controller 180 can control a preview image of the file, which is attached to the corresponding email, to be displayed on the email list.

Figure 21:
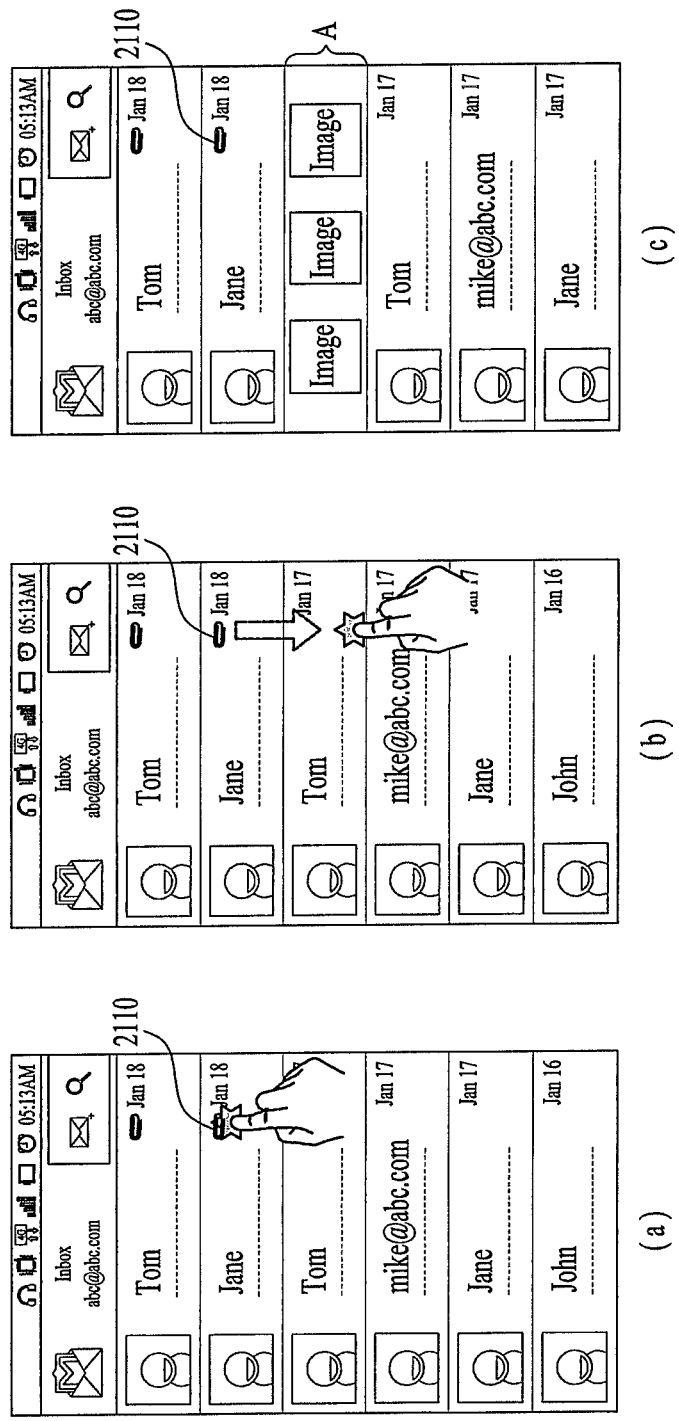
FIG. 21 is a diagram for one example of displaying a preview image of an attachment file attached to a specific email in the course of displaying an email list.

For instance, FIG. 21 is a diagram for one example of displaying a preview image of an attachment file attached to a specific email in the course of displaying an email list. Referring to FIG. 21 (a) and FIG. 21 (b), while an email list is displayed, if a pointer is dragged to move in a prescribed direction while touching an indicator 2110, which indicates that an attachment file is attached, within a region indicating a specific email, referring to FIG. 21 (c), the controller 180 creates a new preview region A in a direction, in which the pointer is dragged to move, and is then able to control a preview image of the attachment file attached to the specific email to be displayed on the created preview region A. In particular, a user can check a content of the attachment file without downloading the attachment file attached to the specific email.

According to the example shown in FIG. 21, a preset user input is an action of dragging a pointer in a bottom direction, by which the preset user input is non-limited. Alternatively, it is a matter of course that a user input of a type different from that of the former user input shown in the drawing can apply to one example of a user input for displaying a preview image of an attachment file.

Figure 22:
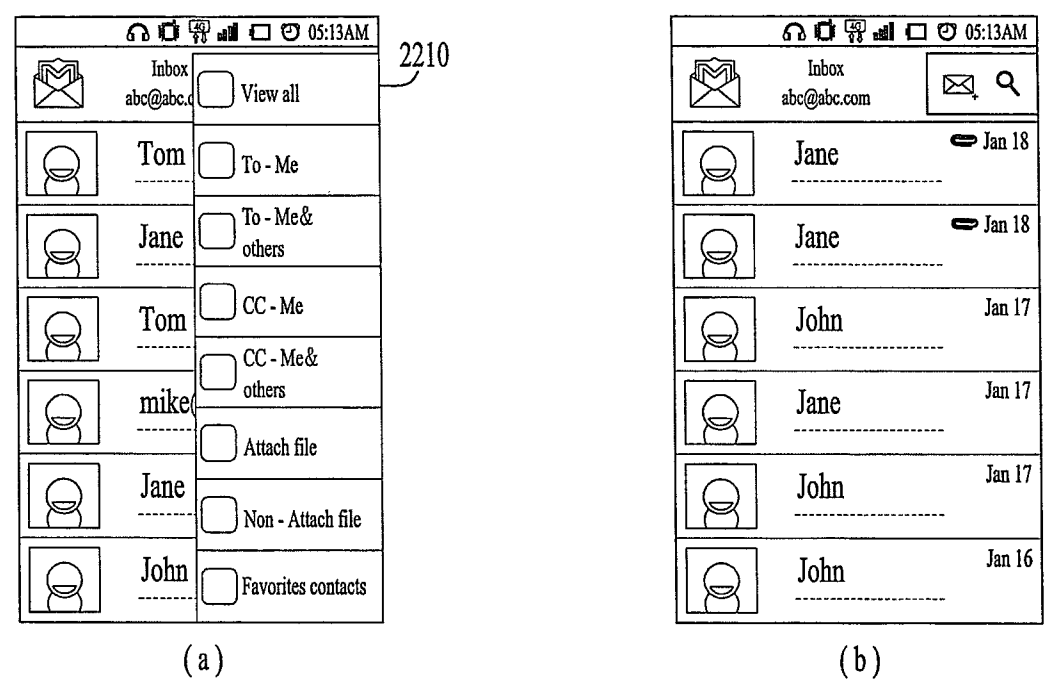

The controller 180 may control an email, which matches a specific reference, to be displayed on an email list only. For instance, FIG. 22 is a diagram for one example of displaying an email matching a specific reference only. In order to select a type of an email to display through an email list, like the example shown in FIG. 22 (*a*), the controller 180 may control a setting menu 2210, which is provided to set up a display reference, to be displayed.

In the setting menu 2210 shown in FIG. 22 (*a*), an item 'View all' may be provided to display all received emails, an item 'To-Me' may be provided to display an email having a user designated as a recipient only, and an item 'To-Me & Others' may be provided to display an email having a user and other people designated as recipients. An item 'CC-Me' may be provided to designate a user as a carbon copy only and an item 'CC-Me & Others' may be provided to display an email having a user and other people designated as carbon copies. An item 'Attached file' may be provided to display an email having an attachment file and an item 'Non-Attached file' may be provided to display an email failing to have an attachment file. Moreover, an item 'Favorite Contact' may be provided to display an email received from a counterpart previously registered as Favorites.

For instance, referring to FIG. 22 (*a*), if an item 'Favorite Contact' is selected, the controller 180 can control an email, which is received from a counterpart registered as Favorites, to be displayed only among all received emails. If counterparts registered at Favorites include Jane and John, referring to FIG. 22 (*b*), the controller 180 can control emails, which are received from Jane and John, to be displayed only.

If at least two items are selected from the setting menu, the controller 180 may control an email, which satisfies at least one of the at least two items, to be displayed. For instance, if the item 'To-Me' and the item 'CC-Me' are selected, the controller 180 may be able to display both an email corresponding to the item 'To-Me' and an email corresponding to the item 'CC-Me'.

Different colors may be assigned to the items of the setting menu, respectively. The controller 180 can control each item of an email list to be displayed in a manner of being mapped to a color assigned to each item of the setting menu. For instance, if the color assigned to the item 'To-Me' is red and the color assigned to the item 'CC-Me' is blue, the controller 180 controls an email corresponding to the item 'To-Me' to be represented in red and also controls an email corresponding to the item 'CC-Me' to be represented in blue.

According to the example shown in FIG. 22, a position as a recipient, a presence or non-presence of an attached attachment file, a counterpart registered at Favorites and the like can be set as display references. Besides, it is a matter of course that a time (i.e., a period of time), a specific counterpart, a specific contact group and the like can be set as the display references [not shown in the drawing].

The mobile terminal 100 according to the present invention may include an input unit provided to its rear side. A user is able to simultaneously apply user inputs to the input unit provided to the rear side and the display unit 151 in a manner of manipulating the input unit provided to the rear side with an index finger and also touching the display unit with a thumb.

Figure 23:
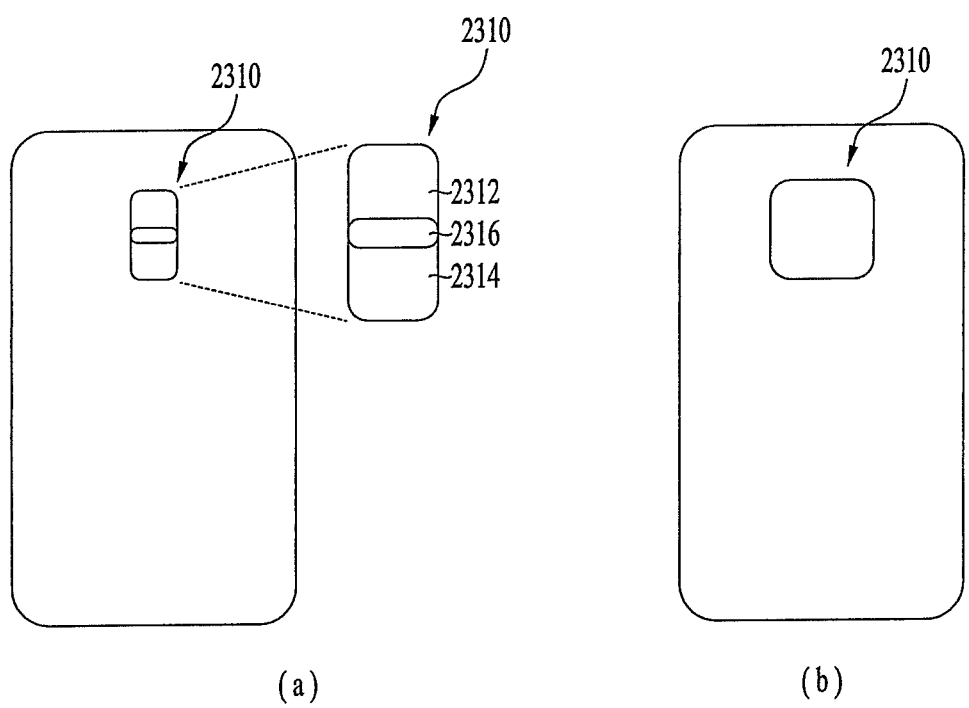
FIG. 23 is a diagram for one example of an input unit provided to a rear side of a mobile terminal.

For instance, FIG. 23 is a diagram for one example of an input unit provided to a rear side of a mobile terminal. Referring to FIG. 23, an input unit 2310 may include a physical button of a type that can be pushed by a user. Alternatively, the input unit 2310 may include a touch panel of a type capable of receiving a touch input from a user. For instance, FIG. 23 (*a*) is a diagram for one example of a case that a type of the input unit 2310 is a physical button type. According to the example shown in FIG. 23 (*a*), the input unit 2310 includes a top button 2312, a bottom button 2314, and a center button 236 provided between the top button 2312 and the bottom button 2314 to distinguish the top button 2312 and the bottom button 2314 from each other.

FIG. 23 (*b*) is a diagram for one example of a case that a type of the input unit 2310 is a touch panel type. If the type of the input unit 2310 is the touch panel type, a user can appropriately manipulate the mobile terminal 100 by touching the input unit 2310.

While an email list is displayed, the mobile terminal 100 according to the present invention can control an appropriate function to be executed based on a user input applied to an input unit. This is described in detail with reference to the accompanying drawings as follows.

Figure 24:
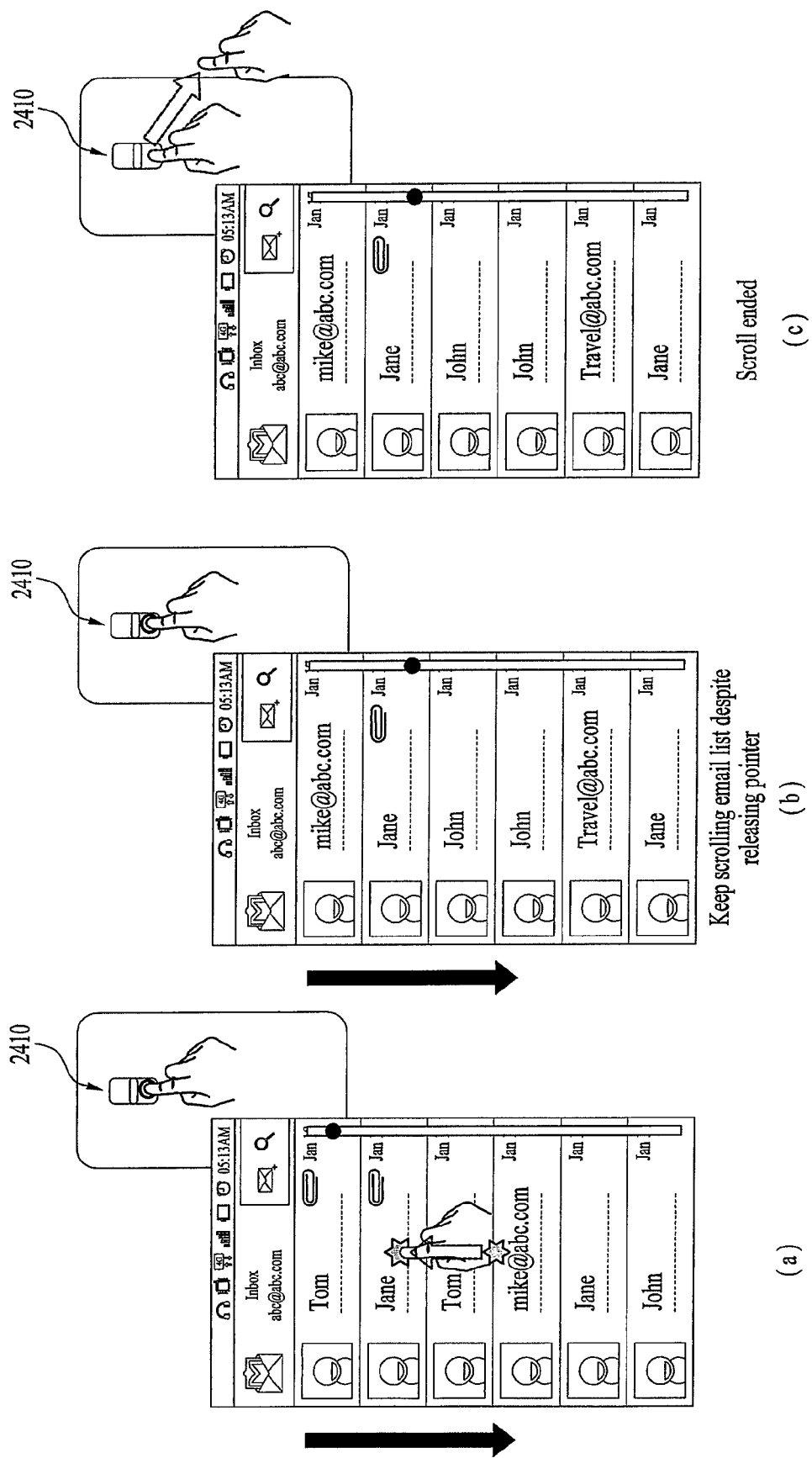
FIG. 24 is a diagram for one example to describe an operation of a mobile terminal in response to a reception of a preset user input through an input unit in the course of scrolling an email list.

FIG. 24 is a diagram for one example to describe an operation of a mobile terminal in response to a reception of a preset user input through an input unit in the course of scrolling an email list.

Referring to FIG. 24, if a drag input for intending to scroll an email list in top and bottom directions is received through the display unit 151, the controller 180 can scroll the email list in the top and bottom directions. For instance, referring to FIG. 24 (*a*), if a drag input for scrolling an email list in a bottom direction is received, the controller 180 can control a new information to appear from a bottom side of the email list by hiding an information displayed on a top side of the email list.

While the email list is scrolled, referring to FIG. 24 (*b*), if a user input is applied to an input unit 2410, although a pointer is released from a touchscreen, the controller 180 can control the email list to keep being scrolled in the same direction. Referring to FIG. 24 (*c*), if the user input is released from the input unit 2410, the controller 180 may control the email list to stop being scrolled.

Like the example shown in FIG. 24, while a user input to the input unit 2410 is maintained, if an email list is scrolled in one direction, the controller 180 can control the email list to keep being scrolled during the user input to the input unit 2410. Hence, instead of applying drag inputs to the display unit 151 repeatedly, a user can control the email list to keep being scrolled to move by manipulating the input unit 2410.

According to the example shown in FIG. 24, a user input for continuously scrolling to move an email list includes an action of pushing one of physical buttons included in the input unit 2410, by which a type of a preset user input is non-limited. For another instance, an action of touching the input unit 2410 may be used as one example of the preset user input.

After a prescribed email has been deleted from an email list, if a preset user input is received through an input unit, the mobile terminal 100 according to the present invention may reconstruct the deleted email. For instance, FIG. 25 is a diagram for one example of reconstructing a deleted email. Referring to FIG. 25, a user can delete a confirmed email, an unnecessary email and the like from an email list. For instance, referring to FIG. 25 (*a*) and FIG. 25 (*b*), if a drag input in a prescribed direction is applied onto a prescribed email in an email list, the controller 180 can control a delete button 2510, which is provided to delete the corresponding email, to be displayed. If the delete button 2510 is touched, referring to FIG. 25 (*c*), the controller 180 can delete the corresponding email. According to the example shown in FIG. 25 9c), an email received from Jane on January 18 is deleted.

After the prescribed email has been deleted from the email list, if a preset user input is received through an input unit 2520, the controller 180 can reconstruct the deleted email. For instance, if a drag input in a preset direction is received through the input unit 2520 [FIG. 25 (*c*)], the controller 180 can control the deleted email to be reconstructed [FIG. 25 (*d*)].

In particular, the controller 180 temporarily saves an email deleted by a user in the memory 160. If a command for reconstructing the deleted email is received through the input unit 2520, the controller 180 can control the deleted email to be reconstructed. Thus, although a user has deleted an important email by mistakes, the user may be able to reconstruct the deleted email through a manipulation of the input unit 2520.

According to the example shown in FIG. 25, a user input for reconstructing a deleted email is an action of applying a drag input in a preset direction to the input unit 2520, by which a type of the preset user input is non-limited. For instance, the preset user input can be implemented with user inputs of various types as well as with the user input shown in the drawing.

Figure 26:
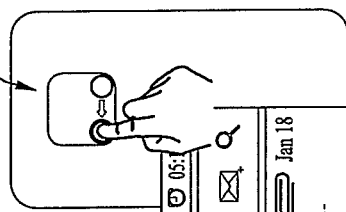
FIG. 26 is a diagram for one example of changing a display reference of an email list by a manipulation of an input unit.

If a preset user input is received through an input unit, the mobile terminal 100 according to the present invention can change a display reference of an email list. For instance, FIG. 26 is a diagram for one example of changing a display reference of an email list by a manipulation of an input unit. As mentioned in the foregoing description with reference to FIG. 22, the mobile terminal 100 according to the present invention is able to control emails, which satisfy a display reference, to be displayed on an email list only. While an email list is displayed in accordance with a specific display reference, if a preset user input is received through an input unit 2610, the controller 180 changes the display reference and is then able to control the email list to be displayed in accordance with the changed display reference. For instance, while emails received from 'Jane' are displayed through an email list only, if a preset user input is received through the input unit 2610 [FIG. 26 (*a*)], the controller 180 changes a display reference and is then able to control emails received from 'John' to be displayed through the email list only [FIG. 26 (*b*)]. Hence, a user may easily change a display reference of the email list by manipulating the input unit 2610.

Besides, while an inbox is displayed, if a preset user input is received, it may be able to control an outbox, a temporary storage box or the like to be displayed [not shown in the drawing].

According to the example shown in FIG. 26, a preset user input for changing a display reference includes a drag input applied to the input unit 2610 in a preset direction, by which a type of the preset user input is non-limited. For instance, the preset user input can be implemented with user inputs of various types as well as with the user input shown in the drawing.

Figure 27A:
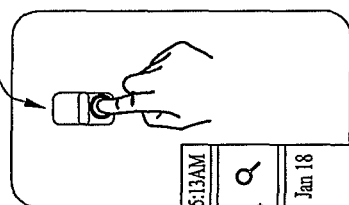
FIG. 27A and FIG. 27B are diagrams for one example of displaying an email compose screen for composing a reply to a specific email or forwarding the specific email.
Figure 27B:
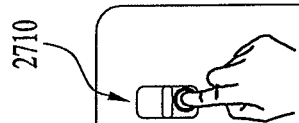

While a prescribed email is selected from an email list, if a preset user input is applied through an input unit, the controller 180 may control an email compose screen, which is provided to compose a reply to the selected email or to forward the selected email, to be displayed. For instance, FIG. 27A and FIG. 27B are diagrams for one example of displaying an email compose screen for composing a reply to a specific email or forwarding the specific email. Referring to FIG. 27A, while a prescribed email is selected from an email list, if a preset user input is received through an input unit 2710 [FIG. 27A (a)], the controller 180 may control an email compose screen, which is provided to compose a reply to a counterpart having sent the selected email, to be displayed [FIG. 27A (b)].

For another instance, referring to FIG. 27B, while a prescribed email is selected from an email list, if a preset user input is received through an input unit 2710 [FIG. 27B (a)], the controller 180 may control an email compose screen, which is provided to forward the selected email to others, to be displayed [FIG. 27B (b)].

In particular, according to the examples shown in FIG. 27A and FIG. 27B, while an email list is displayed, if a preset user input is applied through the input unit 2710, the mobile terminal 100 according to the present invention can display an email compose screen for composing a reply to a specific email or to forwarding the specific email. This can provide a user with convenience in making a reply to a specific email or forwarding the specific email, with ease.

According to the examples shown in FIG. 27A and FIG. 27B, a preset user input includes an action of pushing a bottom or top button of the input unit 2710, by which the preset user input is non-limited. For another instance, a preset user input for sending a reply to a specific email may include a drag input in a $1^{st}$ direction through the input unit 2710 and a preset user input for forwarding a specific email may include an drag input in a $2^{nd}$ direction through the input unit 2710.

While a drag input for updating an email list is being applied, if a preset user input is applied to an input unit, the controller 180 can control an upper reference to be changed.

For instance, FIG. 28 is a diagram for one example to describe an operation of a mobile terminal in response to a reception of a preset user input through an input unit in the course of applying a drag input. While an email list is displayed, referring to FIG. 28 (*a*) and FIG. 28 (*b*), if a pointer is dragged to move in a preset direction, the controller 180 can control an information (e.g., an indicator of a bar type), which indicates that the email list will be updated in accordance with a prescribed upper reference, to be displayed. For instance, referring to FIG. 28 (*b*), an item 'time' is selected as an upper reference.

In doing so, before the drag input is ended, if a preset user input is applied to an input unit 2810, the controller 180 can control an upper reference to be changed in response to the preset user input. For instance, while a time item is selected as an upper reference, if a button provided to the input unit 2810 is pushed [FIG. 28 (*b*)], the controller 180 can control the upper reference to be changed into an item 'character' [FIG. 28 (*c*)].

Once the drag input is ended, the controller 180 may be able to update the email list in accordance with the upper reference selected at the timing point of ending the drag input and a lower reference corresponding to a location at which the drag input is ended. For instance, if a pointer is released from a location shown in FIG. 28 (*c*), the controller may be able to update an email received from Jane only.

Besides, while a prescribed email is selected form an email list, if a preset user input is applied through an input unit, the controller deletes the selected mail or controls the selected email to enter a protective state. If the email enters the protective state, since the email is not deleted until releasing the protective state, it is able to store the corresponding email semi-permanently.

While an email list is displayed, if an input unit is touched, the controller 180 may control a cursor to be displayed through the display unit 151. In doing so, the controller 180 may move the cursor along a touch trace applied to the input unit. And, the controller 180 may control a button or a specific email to be selected in response to a user's touch input.

Accordingly, embodiments of the present invention provide various effects and/or features.

The present invention provides a mobile terminal and controlling method thereof, by which user's convenience can be enhanced.

In particular, the present invention provides a mobile terminal and controlling method thereof, by which an email necessary for a user can be selectively updated only.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which an email necessary for a user can be selectively updated only.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a wireless communication unit configured to receive emails sent to a user from an email server, a display unit configured to display a list of the emails received from the email server, and a controller, if receiving a drag input of moving a pointer touching the display unit in a prescribed direction, partitioning at least one portion of the display unit into a plurality of region having different update references assigned thereto, the controller, if the drag input is ended, controlling the email list to be updated based on an update reference assigned to a prescribed region corresponding to a location having the drag input ended thereat among a plurality of the regions.

In another aspect of the present invention, a method of controlling a mobile terminal according to the present invention may include the steps of displaying an email list through a display unit, if receiving a drag input, partitioning at least one portion of the display unit into a plurality of region having different update references assigned thereto, and if the drag input is ended, updating the email list based on an update reference assigned to a prescribed region corresponding to a location having the drag input ended thereat among a plurality of the regions.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a wireless communication unit configured to receive emails from a server;
a display unit configured to display, on a screen, a list of the emails received from the server; and
a processor configured to:
in response to receiving a drag input in a prescribed direction:
control the display unit to remove at least one portion of the email list from the screen by moving the email list;
partition a portion of the screen into a plurality of regions having different update references assigned thereto; and
control the display unit to display a message indicating an update reference that corresponds to a current location of a pointer for currently applying the drag input, and the message to be displayed at a new region that appears at the removed at least one portion of the email list when the at least one portion of the email list is removed; and
in response to an end of the drag input, update the email list based on the update reference assigned to a prescribed one of the regions corresponding to a position of the pointer for the end of the drag input and display the updated email list on the screen.

2. The mobile terminal of claim 1, wherein when the update reference relates to a maximum receivable email number, the controller is configured to receive, from the server, new emails up to a maximum receivable email number that is based on the update reference assigned to the prescribed region.

3. The mobile terminal of claim 1, wherein when the update reference relates to a maximum receivable data capacity, the controller is configured to receive, from the server, new emails up to a receivable data capacity that is based on the update reference assigned to the prescribed region.

4. The mobile terminal of claim 1, wherein when the update reference relates to a specific counterpart, the controller is configured to receive, from the server, only emails newly sent by the specific counterpart.

5. The mobile terminal of claim 1, wherein the update reference relates to a specific contact group, the controller is configured to receive, from the server, only emails newly sent by at least one counterpart belonging to the specific contact group.

6. The mobile terminal of claim 1, wherein when the update reference relates to a specific time, the controller is configured to update the email list by receiving, from the server, only emails sent at the specific time.

7. The mobile terminal of claim 1, wherein the controller is configured to control the display unit to display a message indicating a number of emails to be updated when applying the update reference assigned to each of the plurality of regions, and the message to be displayed at a new region that appears when the at least one portion of the email list is removed.

8. The mobile terminal of claim 1, wherein the plurality of regions displayed on the screen are partitioned by a plurality of columns and a plurality of rows.

9. The mobile terminal of claim 8, wherein the controller is configured to assign a main update reference to one of the plurality of columns and the plurality of rows, and the controller to also assign a sub update reference subordinate to the other one of the plurality of columns and the plurality of rows.

10. The mobile terminal of claim 9, wherein the controller is configured to update the email list based on the main update reference and the sub update reference respectively corresponding to a specific column and a specific row corresponding to the end of the drag input.

11. The mobile terminal of claim 1, wherein the controller is configured to control the display unit to display an indicator to indicate the update reference assigned to each of the plurality of regions.

12. The mobile terminal of claim 11, wherein in response to an input unit receiving the drag input for scrolling the email list, the controller is configured to control the email list to be scrolled, and wherein when a user input to the input unit is maintained, the controller is configured to control the email list to keep being scrolled while the user input is maintained.

13. The mobile terminal of claim 11, wherein when a prescribed email is selected from the email list based on a preset user input is received through an input unit, the controller is configured to control the display unit to display an email compose screen to compose a reply to a counterpart that sent the selected email or to forward the selected email to another counterpart.

14. The mobile terminal of claim 11, wherein after a prescribed email is deleted from the email list, the controller is configured to restore the deleted email when a preset user input is received at an input unit.

15. A method of controlling a mobile terminal, comprising:
displaying an email list through a display unit having a screen;
in response to receiving a drag input in a prescribed direction:
control the display unit to remove at least one portion of the email list from the screen by moving the email list;
partitioning at least one portion of the screen into a plurality of regions having different update references assigned thereto; and
control the display unit to display a message indicating an update reference that corresponds to a current location of a pointer for currently applying the drag input, and the message to be displayed at a new region that appears at the removed at least one portion of the email list when the at least one portion of the email list is removed; and
in response to an end of the drag input, updating the email list based on the update reference assigned to a prescribed one of the regions corresponding to a position of the pointer for the end of the drag input and display the updated email list on the screen.

16. The method of claim 15, wherein when the update reference relates to a maximum receivable email number, the method further comprises receiving, from the server, new emails up to a maximum receivable email number that is based on the update reference assigned to the prescribed region.

17. The method of claim 15, wherein when the update reference relates to a maximum receivable data capacity, the method further comprises receiving, from the server, new emails up to a receivable data capacity that is based on the update reference assigned to the prescribed region.

18. The method of claim 15, wherein when the update reference relates to a specific counterpart, the method further comprises receiving, from the server, only new emails that are sent by the specific counterpart.

19. The method of claim 15, wherein when the update reference relates to a specific contact group, the method further comprises receiving, from the server, only new emails that are sent by at least one counterpart corresponding to the specific contact group.

20. The method of claim 15, wherein when the update reference relates to a specific time, the method further comprises updating the email list by receiving, from the server, only emails sent at the specific time.

21. A mobile terminal comprising:
a wireless communication unit configured to receive emails;
a display unit configured to display a list of the emails on a screen; and
a processor configured to:
in response to receiving a drag input in a prescribed direction:
control the display unit to remove at least one portion of the email list from the screen by moving the email list;
partition a portion of the screen into a plurality of regions having different update references assigned thereto; and
control the display unit to display a message indicating an update reference that corresponds to a current location of a pointer for currently applying the drag input, and the message to be displayed at a new region that appears at the removed at least one portion of the email list when the at least one portion of the email list is removed; and in response to an end of the drag input, update the email list based on the update reference assigned to a prescribed one of the regions corresponding to a position of the pointer for the end of the drag input and display the updated email list on the screen.

* * * * *